US010609731B2

(12) United States Patent
Roccapriore et al.

(10) Patent No.: US 10,609,731 B2
(45) Date of Patent: Mar. 31, 2020

(54) AIRBORNE GEO-LOCATION OF A WIRELESS LOCAL AREA NETWORK DEVICE

(71) Applicant: SR Technologies, Inc., Davie, FL (US)

(72) Inventors: Phillip Louis Roccapriore, Fort Lauderdale, FL (US); Scott David Boyer, Coral Springs, FL (US); Ryan Busser, Fort Lauderdale, FL (US)

(73) Assignee: SR Technologies, Inc., Sunrise, FL (US)

( * ) Notice: Subject to any disclaimer, the term of this patent is extended or adjusted under 35 U.S.C. 154(b) by 59 days.

(21) Appl. No.: 15/907,395

(22) Filed: Feb. 28, 2018

(65) Prior Publication Data
US 2018/0288806 A1 Oct. 4, 2018

Related U.S. Application Data

(60) Provisional application No. 62/480,730, filed on Apr. 3, 2017.

(51) Int. Cl.
| H04W 74/08 | (2009.01) |
| H04L 12/823 | (2013.01) |
| H04W 64/00 | (2009.01) |
| H04W 28/04 | (2009.01) |
| G01S 13/87 | (2006.01) |
| G01S 13/76 | (2006.01) |
| G01S 13/74 | (2006.01) |
| H04W 84/12 | (2009.01) |
| G01S 5/14 | (2006.01) |

(52) U.S. Cl.
CPC ......... *H04W 74/0816* (2013.01); *G01S 13/74* (2013.01); *G01S 13/767* (2013.01); *G01S 13/876* (2013.01); *H04L 47/32* (2013.01); *H04W 28/04* (2013.01); *H04W 64/003* (2013.01); *G01S 5/14* (2013.01); *H04W 84/12* (2013.01)

(58) Field of Classification Search
CPC ........... H04W 74/0816; H04W 64/003; H04W 28/04; H04W 52/0206; H04L 47/32; H04L 1/1893; G01S 11/00
See application file for complete search history.

(56) References Cited

U.S. PATENT DOCUMENTS

| 2005/0185666 | A1* | 8/2005 | Raya | H04W 24/00 370/461 |
| 2006/0077942 | A1* | 4/2006 | Panwar | H04L 45/121 370/338 |
| 2010/0046388 | A1* | 2/2010 | Kim | H04L 43/0864 370/252 |

* cited by examiner

Primary Examiner — Anez C Ebrahim
(74) Attorney, Agent, or Firm — Christopher & Weisberg, P.A.

(57) ABSTRACT

Methods are disclosed that improve the location of a ground based Wi-Fi device using an airborne Wi-Fi station. One embodiments of the disclosure describes the periodic transmission of bursts of RTS packets in order to reduce interference to the responding CTS packets. Another embodiment of the disclosure describes the use of specific values used in the RTS Duration fields that enable the responding CTS packet to be identified and linked to the RTS packet to which it is responding. A further embodiment of the disclosure describes the use of a packet transmitted at the end of each burst that resets the NAV times for all ground networks.

20 Claims, 18 Drawing Sheets

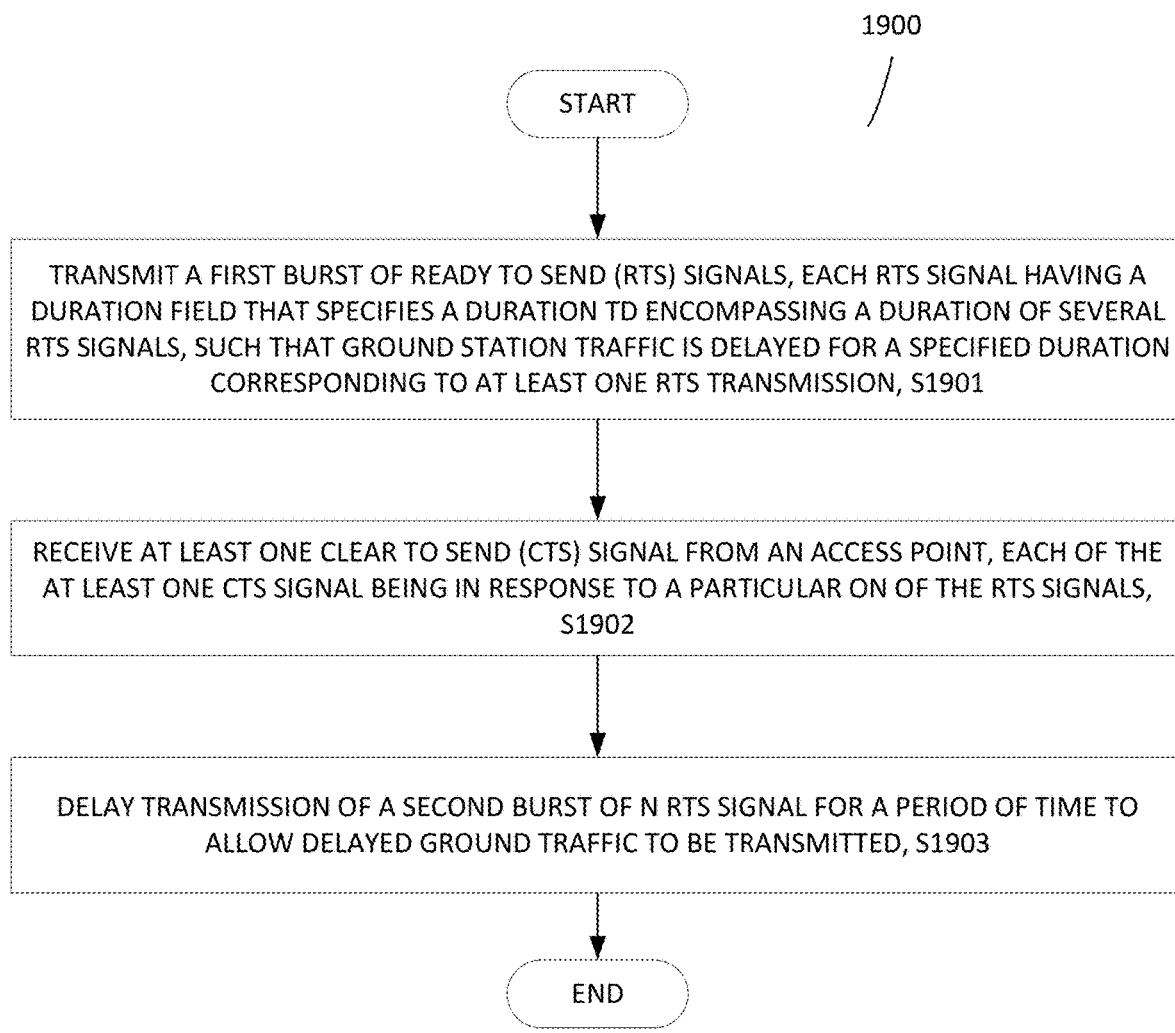

AIRBORNE GEO-LOCATION OF A WIRELESS LOCAL AREA NETWORK DEVICE

CROSS-REFERENCE TO RELATED APPLICATION

This application is related to and claims priority to U.S. Provisional Patent Application Ser. No. 62/480,730, filed Apr. 3, 2017, entitled "AIRBORNE GEO-LOCATION OF A WIRELESS LOCAL AREA NETWORK DEVICE," the entirety of which is incorporated herein by reference.

STATEMENT REGARDING FEDERALLY SPONSORED RESEARCH OR DEVELOPMENT n/a

TECHNICAL FIELD

The present disclosure relates to wireless communications and in particular to the geo-location of wireless local area network (WLAN) devices.

BACKGROUND

Initially, it is noted that Institute of Electrical and Electronics Engineers (IEEE) Standard 802.11-2016 is used as the base reference for disclosures used in this disclosure, the entire contents of which are incorporated herein by reference. The IEEE 802.11 Standard is commonly referred to as "Wi-Fi". A Wi-Fi network generally includes an access point (AP) and a number of stations (STA).

Determination of the location of WLAN devices can be performed by various means. Of particular interest for this disclosure is the location of devices that are based upon the IEEE 802.11 technology, commonly known as Wi-Fi. Various methods can be used to locate an access point (AP), or a station (STA). These methods may be classified as active, passive and combined active and passive. In an active location scheme, a device that is determining the range and location, the measuring device, transmits certain packets to the device being located, the target device, and the common method is to measure the time of arrival (TOA) of the response from the target device and compare that to the time of departure (TOD) that the packet was transmitted by the measuring device.

In such location systems it is common to use multiple measuring devices to determine the device location. In such a scheme, simultaneous TOA and/or TOD measurements are taken by different measuring devices situated at different points and the location of the target device calculated.

In an active location scheme, TOD may be measured for a packet that is transmitted from the measuring station addressed to the target station. The TOA of the response from the target station at the measuring station is then also measured. If the turnaround time for the target station to receive the packet from the measuring station and to start to transmit the response is known, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the packet transmitted from the measuring station to the target station is a data packet, the response from the target station will normally be an acknowledgement (ACK) packet. If the packet transmitted from the measuring station to the target station is a control packet, for example, a "ready to send", also referred to as a "request to send", (RTS) packet, then the response from the target station will normally be a clear-to-send (CTS) packet. In these two examples, the turnaround time at the target station is defined in the IEEE 802.11 standard as the short interframe spacing (SIFS) which is a preset value. Hence, the time delay $\delta t$, between the measuring station and the target station, may be determined from the calculation $\delta t=(TOA-TOD-SIFS)/2$ and the distance between the measuring station and the target station is then $\delta t/c$, where c is the speed of light. This method of estimating the distance to a target station by measuring the TOD and TOA and accounting for the turnaround time is known in the art.

FIG. 1 is a diagram of a typical location system 100 which includes three measuring stations 10a, 10b and 10c (referred to collectively herein as "measuring stations" or "measuring receivers" 10). The target 12 is a wireless device, such as, for example, an Access Point (AP) that is to be located by the three measuring stations 110. The distance of the AP 120 from measuring station 10a is D1, 130. The distance of the AP 120 from measuring station 10b is D2, 140. The distance of the target 12 from measuring station 10c is D3, 150. The time delay, $\delta t1$, determined from the calculation $\delta t=(TOA-TOD-SIFS)/2$), is measured for transmissions from measuring station 10a and this can be used to calculate the distance D1 130 using the formula $D1=\delta t1/c$ where c is the speed of light. Similarly $\delta t2$ and $\delta t3$ measurements result in the determination of distances D2 140 and D3 150. The methods for calculating the location of AP 120 using the distances D1, 130, D2 140 and D3 150 are well known in the art and are beyond the scope of this disclosure.

SUMMARY

Methods and an airborne station configured to measure a distance between the airborne station and ground base station. According to one aspect, a method includes transmitting from the airborne station, in succession, a plurality of request to send (RTS) transmissions, each RTS transmission having a duration field that specifies a duration that extends beyond transmission times of at least a subset of the plurality of RTS transmissions, such that ground local area network traffic is delayed for a specified duration corresponding to at least one RTS transmission. The method includes receiving at least one clear to send (CTS) transmission from the ground base station, each CTS transmission being in response to an RTS. The method further includes computing the distance between the airborne station ground base station based on a time difference between transmission of a particular one of the RTS transmissions and receipt of a CTS transmission responsive to the particular one of the RTS transmissions.

According to this aspect, in some embodiments, a CTS transmission responsive to the particular one of the RTS transmissions is identified based on a duration value contained in the CTS transmission. In some embodiments, a duration TDn specified by an nth RTS transmission is given by: $TDn=TDn-1+(n-1)\ Np$ for $TDmin<TDn<TDmax$, where Np is a number. In some embodiments, a duration TDc contained in the CTS transmission responsive to the nth RTS transmission is given by: $TDcn=TDn-1+(n-1)\ Np-\Delta$ for $TDmin<TDn<TDmax$, where $\Delta$ is a number. In some embodiments, the method further includes transmitting a packet subsequent to the plurality of RTS transmissions, the subsequent packet configured to reset network allocation vector (NAV) times for ground stations whose ground local area network traffic was delayed. In some embodiments, time differences for multiple pairs of RTS transmissions and CTS transmission are averaged. In some embodiments, the plurality of RTS transmissions are transmitted in a burst, followed by a time period that is longer than a duration of the burst to enable time for the delayed ground station traffic to be transmitted between bursts. In some embodiments, the first airborne station has a plurality of receivers and the processor is further configured to compute, for each receiver of the plurality of receivers, a time difference based on a CTS signal received by the receiver, and average the time differences computed by the plurality of receivers.

According to another aspect, an airborne station configured to measure a distance between the first airborne station and ground base station is provided. The airborne station includes a transmitter configured to transmit in succession a plurality of request to send (RTS) transmissions, each RTS transmission having a duration field that specifies a duration that extends beyond transmission times of at least a subset of the plurality of RTS transmissions, such that ground local area network traffic is delayed for a specified duration corresponding to at least one RTS transmission. The first airborne station further includes at least one receiver configured to receive at least one clear to send (CTS) transmission from the ground base station, each CTS transmission being in response to an RTS. The first airborne station further includes a processor configured to compute the distance between the airborne station based on a time difference between transmission of a particular one of the RTS transmissions and receipt of a CTS transmission responsive to the particular one of the RTS transmissions.

According to this aspect, in some embodiments, a CTS transmission responsive to the particular one of the RTS transmissions is identified based on a duration value contained in the CTS transmission. In some embodiments, a duration TDn specified by an nth RTS transmission is given by TDn=TDn−1+(n−1) Np for TDmin<TDn<TDmax, where Np is a number. In some embodiments, a duration TDc contained in the CTS transmission responsive to the nth RTS transmission is given by TDcn=TDn−1+(n−1) Np−Δ for TDmin<TDn<TDmax, where Δ is a number. In some embodiments, the transmitter further transmits a packet subsequent to the plurality of RTS transmissions, the subsequent packet configured to reset network allocation vector (NAV) times for ground stations whose ground local area network traffic was delayed. In some embodiments, time differences for multiple pairs of RTS transmissions and CTS transmission are averaged. In some embodiments, the plurality of RTS transmissions are transmitted in a burst, followed by a time period that is longer than a duration of the burst to enable time for the delayed ground station traffic to be transmitted between bursts. In some embodiments, the first airborne station has a plurality of receivers and the processor further computes, for each receiver of the plurality of receivers, a time difference based on a signal received by the receiver; and averages the time differences computed by the plurality of receivers.

According to yet another aspect, a method in an airborne station is provided. The method includes transmitting a first burst of request to send (RTS) signals, each RTS signal having a duration field that specifies a duration Td encompassing a duration of several RTS signals such that ground local area network traffic is delayed for a specified duration corresponding to at least one RTS transmission. The method further includes receiving at least one clear to send (CTS) signal from a ground based station, each of the at least one CTS signal being in response to a particular one of the RTS signals. The method also includes delaying transmission of a second burst of N RTS signal for a period of time to allow delayed ground local area network traffic to be transmitted.

According to this aspect, in some embodiments, a CTS signal is deemed to be responsive to a particular one of the RTS signals based on a duration value contained in a duration field of the CTS signal. In some embodiments, the method further includes transmitting a packet subsequent to the burst of RTS transmissions, the subsequent packet configured to reset network allocation vector (NAV) times for ground stations whose ground local area network traffic was delayed. In some embodiments, the airborne station has a plurality of receivers and the method further includes computing, for each receiver of the plurality of receivers, a time difference based on a signal CTS signal received by the receiver and averaging the time differences computed by the plurality of receivers.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 19 is flowchart of an alternative exemplary process for measuring a distance between the first airborne station and one of a second airborne station and an access point.

DETAILED DESCRIPTION

In one embodiment of the present disclosure, a single measuring airborne station is used. The present disclosure describes methods and devices for improvements to methods for active measurement of the distance to a target station as compared with known methods and devices. In one embodiment, the target station is an access point conforming to the IEEE 802.11 standard and the measuring station is airborne and may also be a device that conforms to the IEEE 802.11 standard. As used herein, the target station may be referred to as a ground based station, and, in some embodiments, the ground based station may be or include a wireless access point.

A succession of control packets, for example RTS packets, with predetermined duration values are sent by an airborne station such that the ground based networks delay their traffic allowing the wanted responses, for example CTS packets, to be received at the airborne station. The predetermined duration values of the control packets sent by the airborne station are such that the duration values of the corresponding control packet responses are unique and hence each response can be matched to the request that caused it. The succession of control packets may be followed by a management packet, such as a probe request, so as to reset network allocation vector (NAV) times for the ground based networks.

Figure 1:
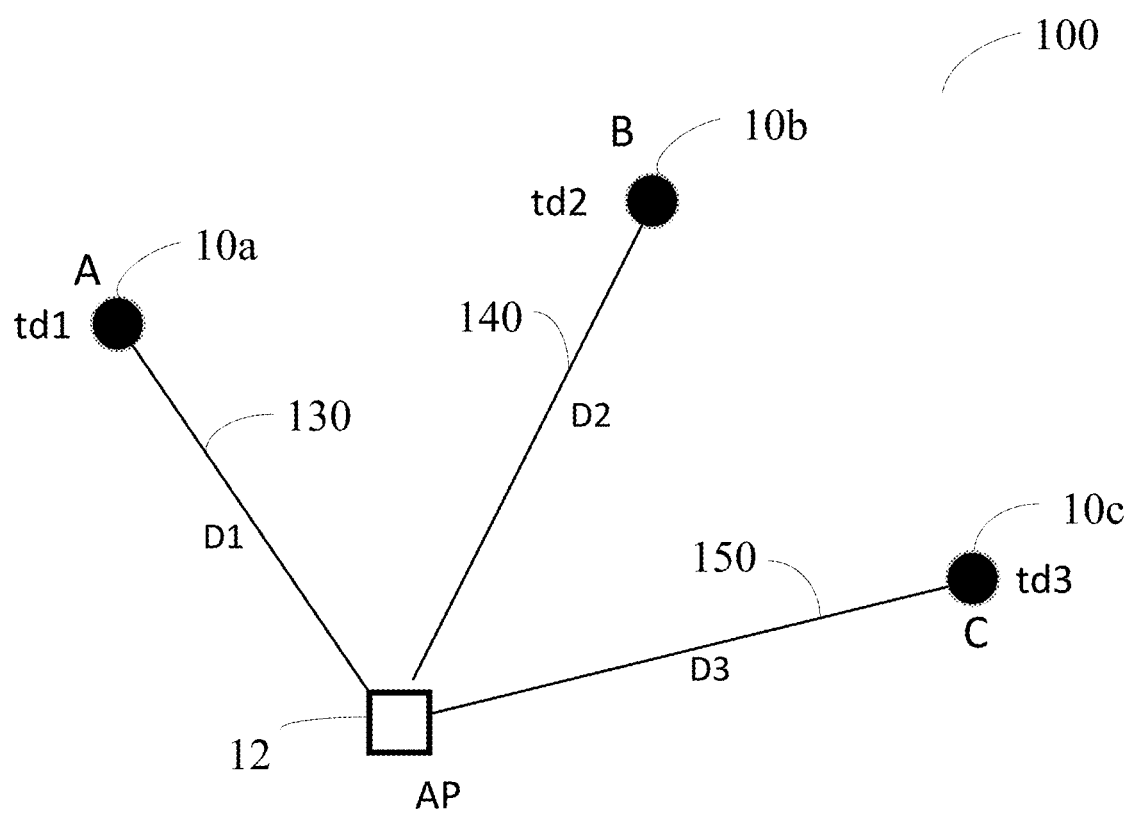
FIG. 1 is a diagram of a typical location system 100 which includes three measuring stations.
Figure 2:
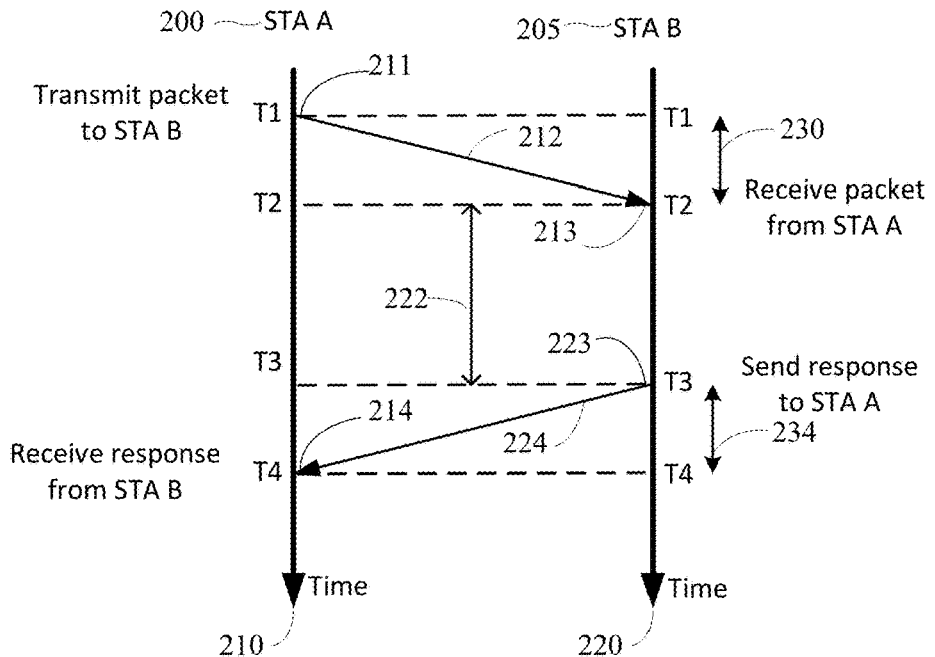
FIG. 2 is a timing diagram that describes the ranging method of the present disclosure that may be used to determine the distance between two wireless devices.

Referring now to the drawing figures in which like reference designators refer to like elements, FIG. 2 is a timing diagram that describes a ranging method of the present disclosure that may be used to determine the distance between two wireless devices, wireless device STA A 200 and wireless device STA B 205. In one embodiment, one of the wireless devices (i.e., one of STA A 200 and STA B 205) is AP 120. In another embodiment, at least one of wireless devices (i.e., at least one of STA a 200 and STA B 205) is measuring receiver 10. Time axis 210 refers to the time axis for STA A 200 and time axis 220 refers to the time axis for STA B 205. At time T1 211, STA A 200 transmits a packet to STA B 205. This transmission 212 is received at STA B 205 at time T2 213. The propagation time of the transmission 212 is (T2−T1) 230. STA B 205 transmits a response 224 at time T3 223. The time 222 that has elapsed between the reception of the packet at time T2 213 and the transmission at time T3 223 is the turnaround time at STA B 205. Ideally the turnaround time 222 at STA B will be equal in duration to SIFS. At time T4 214, STA A 200 receives the response 224 from STA B 205. The propagation time of the transmission for the response 224 is (T4−T3) 234. It should be noted that the time differences 230 (T2−T1) and 234 (T4−T3) represent the propagation time, δt, of the transmissions and should be equal, assuming the distance between the two stations has not changed. The total time that elapses between the transmission 212 and the response 224 at STA A 200 is $$(T2-T1)+(T3-T2)+(T4-T3)=(T4-T1)=\delta t+\text{SIFS}+\delta t \quad (1)$$

Hence, $$\delta t=(T4-T1-\text{SIFS})/2 \quad (2)$$

Expression (2) is a simplified equation that is included to provide the basic idea of the ranging transmission method. Note that the duration of the transmitted packet and the response packet is not accounted for in equation (2). Also note that in practice it is common that the timestamp of a packet is set to coincide with the end of the packet at the point where the frame check is completed.

Figure 3:
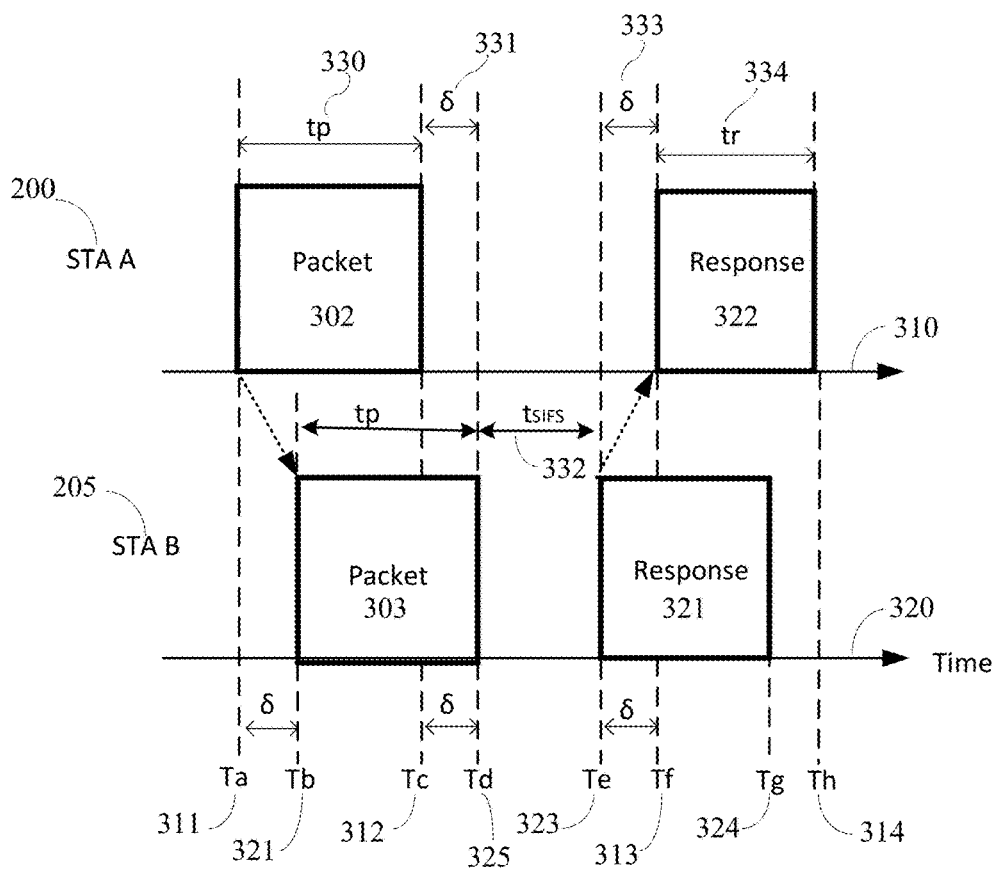
FIG. 3 is a timing diagram that describes in further detail the ranging transmission method.

FIG. 3 is a timing diagram that describes in further detail the ranging transmission method. Time axis 310 is the time axis for STA A 200 and time axis 320 is the time axis for STA B 205. At time Ta 311, STA A 200 starts the transmission of packet 302 which is addressed to STA B 205. After a time delay of δt, at time Tb 321, STA B 205 starts to receive packet 303, which ideally is identical to packet 302. Packet 303 may differ in the value of particular bits dues to propagation and channel conditions but in general, packet 302 and packet 303 are the same. At time Tc 312, STA A 200 completes the transmission of packet 302 and at time Td 325, STA B 205 completes the reception of packet 303. The time difference between Tc 312 and Td 325 is δ, the propagation time for the packet to travel from STA A 200 to STA B 205. Note that the time differences (Tc−Ta) and (Td−Tb) are both the duration tp 330 of the transmitted packet 302.

STA B 205 transmits the response packet 321 at time Te 323. Assuming that the response is an ACK or an RTS packet in reply to the received packet 303, time Te ideally will be at a time $t_{SIFS}$ 332 after time Td 325, where $t_{SIFS}$ 332 is the SIFS time as defined in the IEEE 802.11 standard. At time Tf 313, STA A 200 starts to receive the response 322 which ideally is identical to response 321 sent by STA B 205. At time Tg 324, STA B 205 completes the transmission of the response 321 and at time Th 314, STA A 200 completes receiving the response 322. Note that the time differences (Tb−Ta), (Td−Tc), (Tf−Te) and (Th−Tg) are all equal and have the value δt which is the propagation time for the packet and response to travel between the two STAs.

At STA A 200, the time of a packet at the point when the frame check has completed, may be recorded. Hence, if STA A 200, is the measuring station, the time for the transmission of packet 302 that is recorded is Tc 312, and the time that is recorded for the reception of the response 322 is Th 314. In order to calculate the value of δt, it is necessary to know the duration tr 334 of the response 322. Calculating the duration tr 334 is straightforward as the measuring station STA A 200 can monitor the details of the response packet such as data rate and length. In practice therefore, STA A 200 can calculate the value of δt from expression (3):

$$\delta t=(Th-Tc-tr-t_{SIFS})/2 \quad (3)$$

Stated another way, STA A 200 begins transmission of ranging packet 302 at a beginning transmission time Ta 311 and ends transmission of the ranging packet 302 at an ending transmission time Tc 312. STA B 205 begins receiving of the first ranging packet 302 at a beginning reception time Tb 321 and receives the complete first ranging packet 302 at an ending reception time Td 325, wherein δt is measured as the time between the ending transmission time Tc 312 and the ending reception time Td 325.

In the case where there is a single airborne measuring station 110, as may be the case when the station is airborne, then the three measuring distances D1 130, D2 140 and D3 150 will be taken at different points in time. In this case, the airborne measuring station 110 (STA 110) may be flying over an area and periodically transmitting the packets 302, receiving the response packets 322 and calculating the delay time δt. Over time the location of AP 120 can be calculated with increasing accuracy as more measurements are taken by the airborne measuring station 110 from varying positions. Such calculations are well known in the art and are beyond the scope of this disclosure.

As mentioned previously, the packet exchange may be any pair of packets where an automatic response packet is sent. Commonly used packets are an RTS/CTS exchange and a Data (null)/ACK exchange. In the following descriptions, the RTS/CTS exchange will be used, it being understood that other arrangements beyond RTS/CTS and Data (null)/ACK exchanges can be used.

Figure 4:
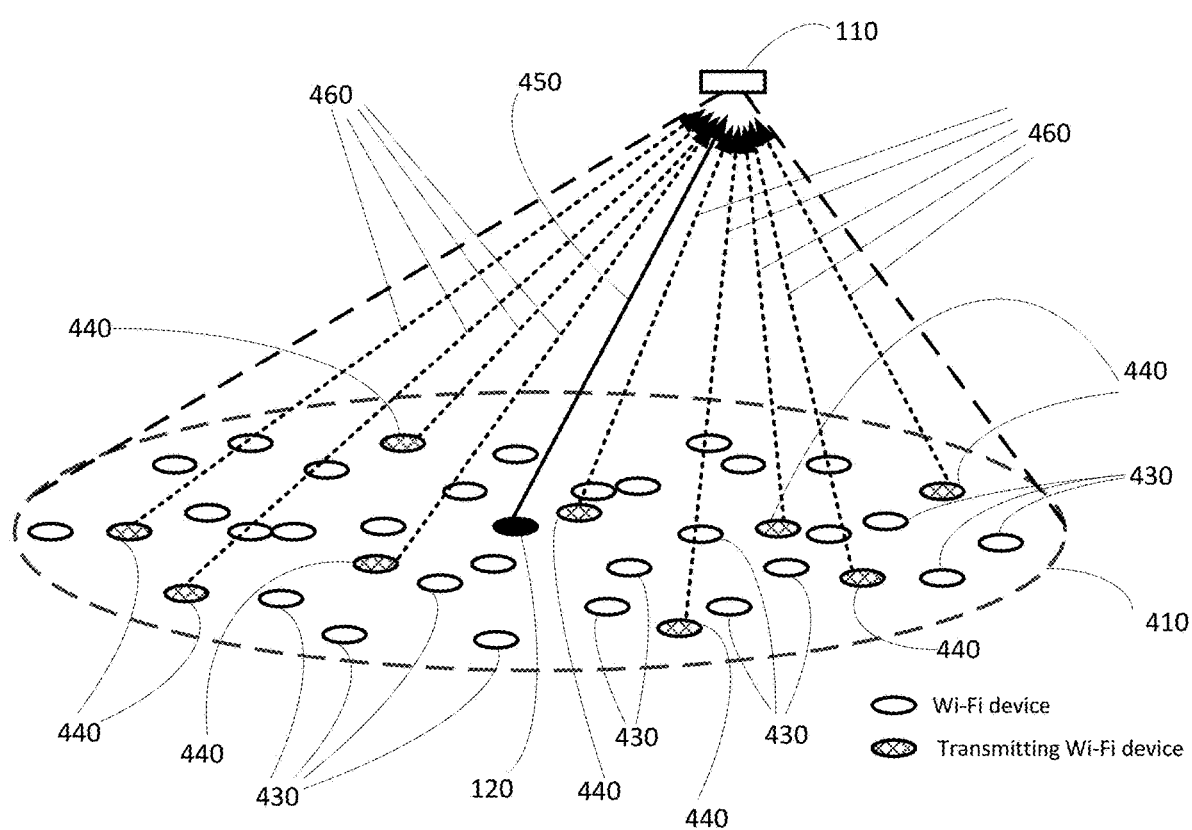
FIG. 4 is a schematic diagram depicting an airborne measuring station that is receiving transmissions from a multitude of Wi-Fi access points and stations.

FIG. 4 is a schematic diagram depicting an airborne measuring station 110 that is receiving transmissions from a multitude of Wi-Fi access points and other ground based stations, 120, 430 and 440, within a coverage area 410 which is compatible with the antenna coverage of the airborne station (STA) 110. In the example depicted in FIG. 4, the airborne measuring STA 110 is attempting to communicate with ground based device AP 120. Within the area 410 at the same time that AP 120 is transmitting it is extremely likely that a number of other devices 440, are also transmitting. Therefore, at the airborne measuring STA 110, a number of transmitted Wi-Fi unwanted signals 460 are being simultaneously received in addition to the wanted signal 450. This multiple reception has two consequences: first, the wanted signal 450 cannot be successfully decoded at the airborne measuring STA 110 due to the interference from the unwanted signals 460, and second, the airborne measuring STA 110 may be prevented from transmitting due to the carrier sensing (CS) determining that the medium is effectively always busy. The more networks that are in the reception area 410, the worse the situation in that the wanted signal 450 cannot be successfully decoded at the airborne measuring STA 110 due to the interference from the unwanted signals 460. The more networks that are in the reception area 410, the worse the situation. In order to transmit, the airborne measuring STA 110 may use a transmitter that ignores the CS.

Transmissions from the airborne measuring STA 110 have the potential to be received by all the ground based stations. However, there is a likelihood that the response packets 321 as part of wanted signal 450 from the ground AP 120 are not received at the airborne measuring STA 110 due to unwanted signals 460, i.e., interference. In addition, if just some of the response packets 322 received at the airborne measuring STA 110 are blocked and others are received, the airborne measuring STA 110 may not be able to distinguish which response 322 corresponds to which transmitted packet 302.

The Standard describes the medium access scheme used in Wi-Fi. The basic medium access scheme in Wi-Fi uses the CSMA/CS (carrier sense multiple access with collision avoidance) protocol. Carrier sense, CS, is the function that determines if the medium is busy or idle. The virtual CS mechanism is achieved by distributing reservation information announcing the impending use of the medium. The duration field in individually addressed frames is used to distribute the medium reservation information and this field gives, for example, the time that the medium is reserved to the end of the acknowledgment (ACK) frame sent in response to the initial frame. Another means of distribution of this medium reservation information is the exchange of RTS (request to send or ready to send) and CTS (clear to send) frames often sent prior to a data frame, again using the duration field to indicate the total medium reservation required to complete the data packet and ACK exchange following the RTS, CTS exchange. Basically, any STA or AP, other than the addressed device, that receives and decodes the duration field will delay transmitting any packet until that reservation period has expired after the receipt of the packet that contained the duration field.

Figure 5:
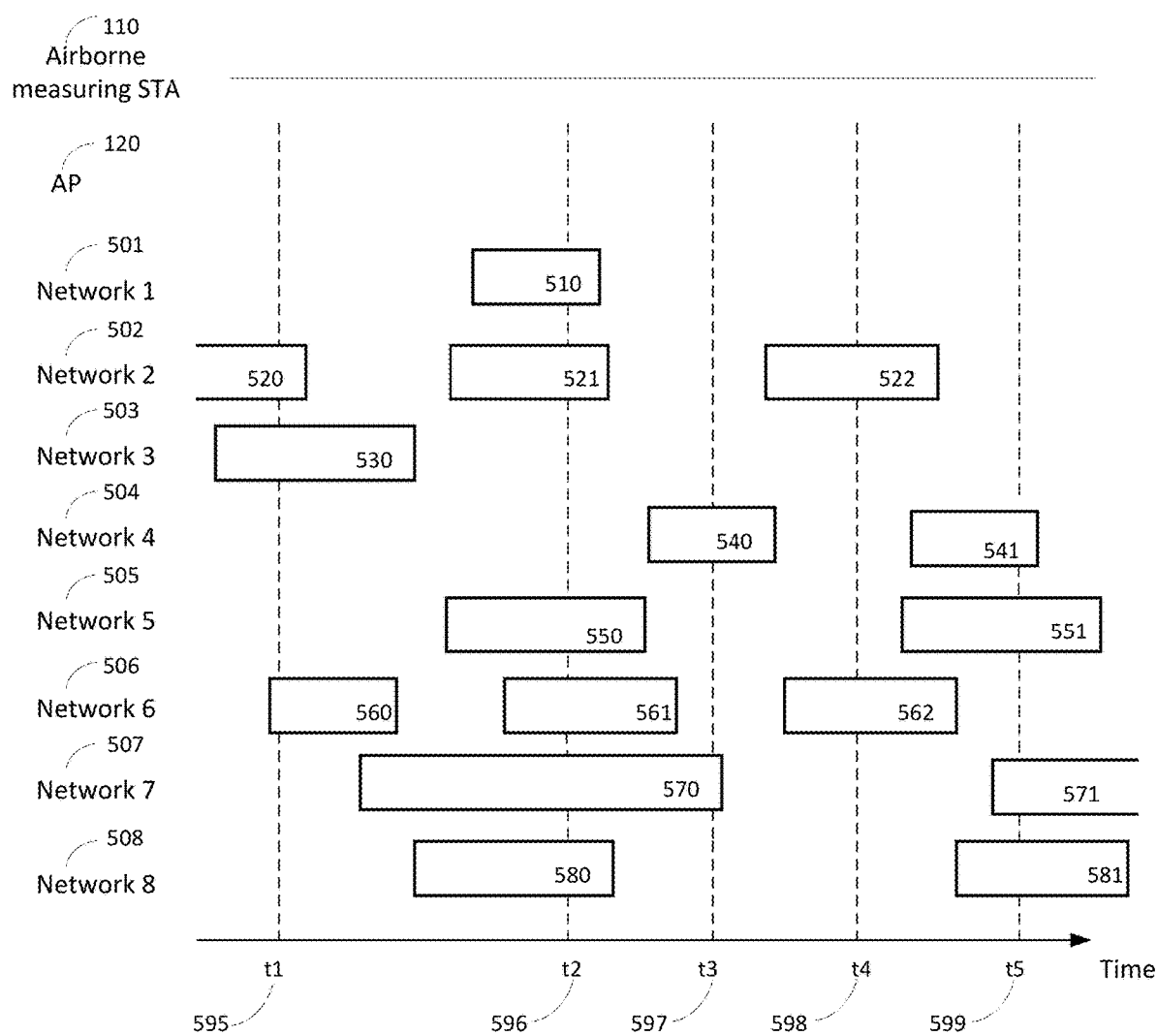
FIG. 5 is a timing diagram that further describes by example the interference to reception at station.

FIG. 5 is a timing diagram that further describes an example of the interference to reception at the airborne measuring STA 110 if there are a number of active networks in the reception area 410. FIG. 5 depicts a number of ground based networks, networks 1 to 8, 501 to 508 respectively, together with examples of transmission of packets in those networks, 510, 520, 521, 522, 530, 540, 550, 551, 560, 661, 562, 570. 571, 580 and 581. As the networks 1 to 8, 501 to 508 in this example, are ground based then it is assumed that they are not overlapping and hence may transmit simultaneously whereas, as the airborne measuring STA 110 is airborne, it does receive all of the transmissions. In this example, at time t1 595, transmission 520, from network 2 502, transmission 530, from network 3 503 and transmission 560 from network 6 506 are all being received at the airborne measuring STA 110. Similarly, at time t2 596, transmissions of packets 510, 521, 550, 561, 570 and 580, from networks 1 (501), 2 (502), 5 (505), 6 (506) 7 (507) and 8 (508) respectively are all being received at the airborne measuring STA 110. Similarly, in this example, at times t3 597, t4 598 and t5 599 there are multiple simultaneous transmissions and furthermore, it can be readily observed that at no time is the medium idle as seen by the airborne station 110. As a result, the reception at airborne measuring STA 110 is continuously subject to interference.

Figure 6:
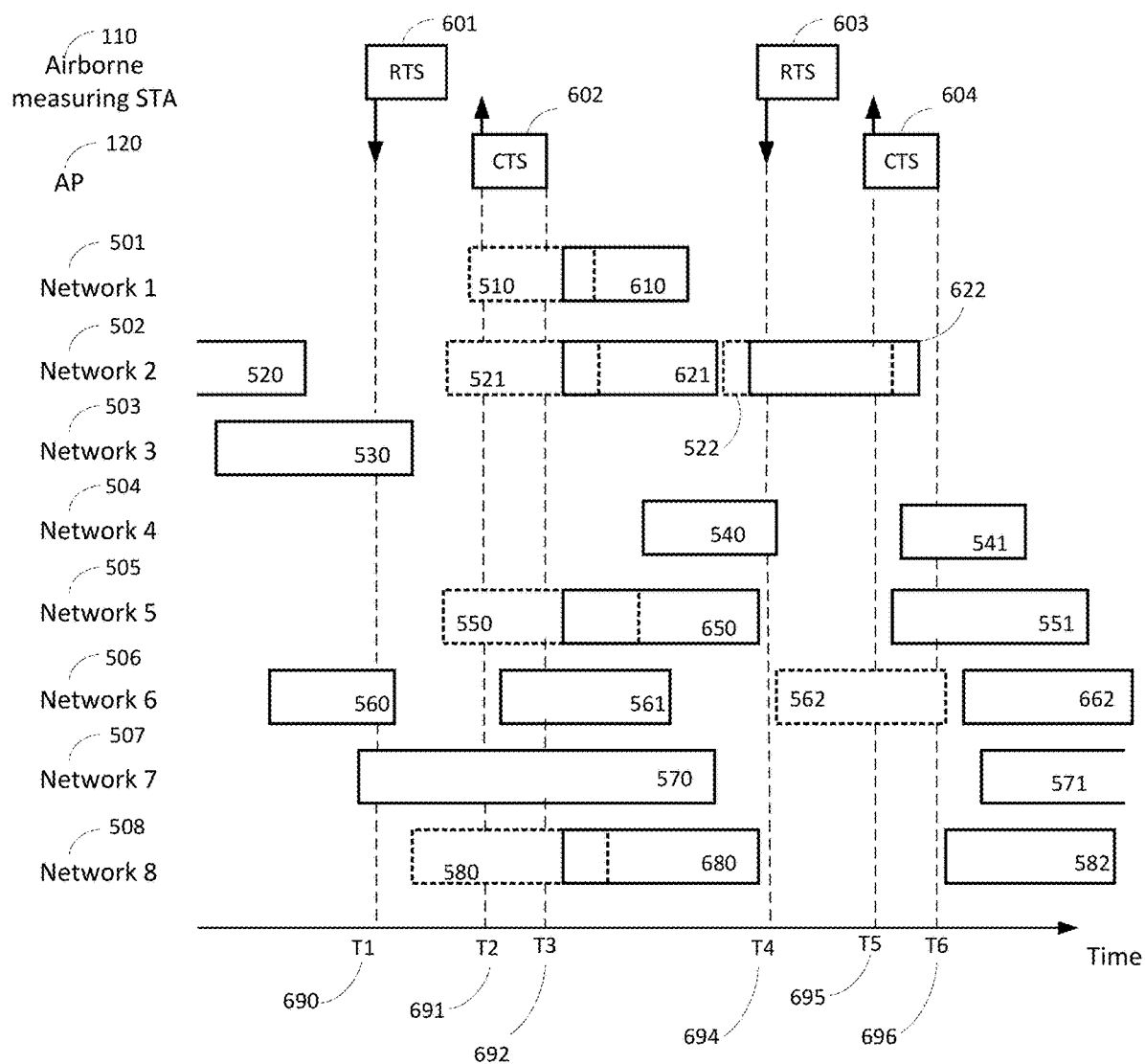
FIG. 6 depicts the situation when airborne STA is attempting RTS CTS exchanges with the ground AP so as to measure the delay time.

FIG. 6 depicts the situation when airborne measuring STA 110 is attempting RTS/CTS exchanges with the AP 120 so as to measure the delay time. The networks 1 to 8, 501 to 508 and the traffic in those networks is the same as previously shown in FIG. 5. At time T1, 690, airborne measuring STA 110 transmits an RTS packet 601 addressed to AP 120. The RTS packet contains a duration field value that is intended to reserve the medium for a time that covers the transmission of the expected CTS packet 602 from AP 120. In this example, the RTS transmission 601 will cause transmissions of packets 510, 521, 550, and 580 to be delayed to after time T3 692 as each of those networks receives the RTS 601 and obeys the virtual NAV set by the duration field in the RTS packet. Packets 610, 621, 650 and 680 depict the delayed packets 510, 521, 550, and 580 respectively. However, at time T2 691 when AP 120 transmits the responding CTS packet 602, the reception at airborne measuring STA 110 is subject to interference from packets 561 and 570. The CTS packet 602 may or may not therefore be successfully received at airborne measuring STA 110.

Similarly, at time T4 694, airborne measuring STA 110 transmits another RTS packet 603 addressed to AP 120. The RTS transmission 603 will cause packet 562 to be delayed to after time T6 696 as network 6 (506) receives the RTS 603 and obeys the virtual NAV set by the duration field in the RTS packet. Packet 662 depicts the delayed packet 562. Because of the delaying of packet 621 by the duration value in RTS packet 601, the packet 522 in network 2 (502) is also slightly delayed and, in this example, packet 622 is the delayed packet 522. As a result, at time T5 695 when AP 120 transmits the responding CTS packet 604, the reception at airborne measuring STA 110 is subject to interference from packets 622, 541 and 551. The CTS packet 604 may or may not therefore be successfully received at airborne measuring STA 110. In general, a CTS packet from the AP 120 may or may not be successfully received at airborne measuring STA 110 dependent upon the timing and relative signal strength(s) of the interference.

As previously stated, the RTS transmissions from the airborne measuring STA 110 have the potential to be received by all the ground based stations including the intended recipient AP 120, but there is a likelihood that the CTS response packets from the ground AP 120 are not received at the airborne measuring STA 110 due to interference from the traffic in the active networks within the coverage area 410. In addition, if just some of the CTS response packets received at the airborne measuring station 110 are blocked and others are received, the airborne measuring STA 110 may not be able to distinguish which CTS response corresponded to which transmitted packet 302. This situation may cause inaccuracies in calculating the delay times and thus may lead to inaccuracies in geo-location determination.

Figure 7:
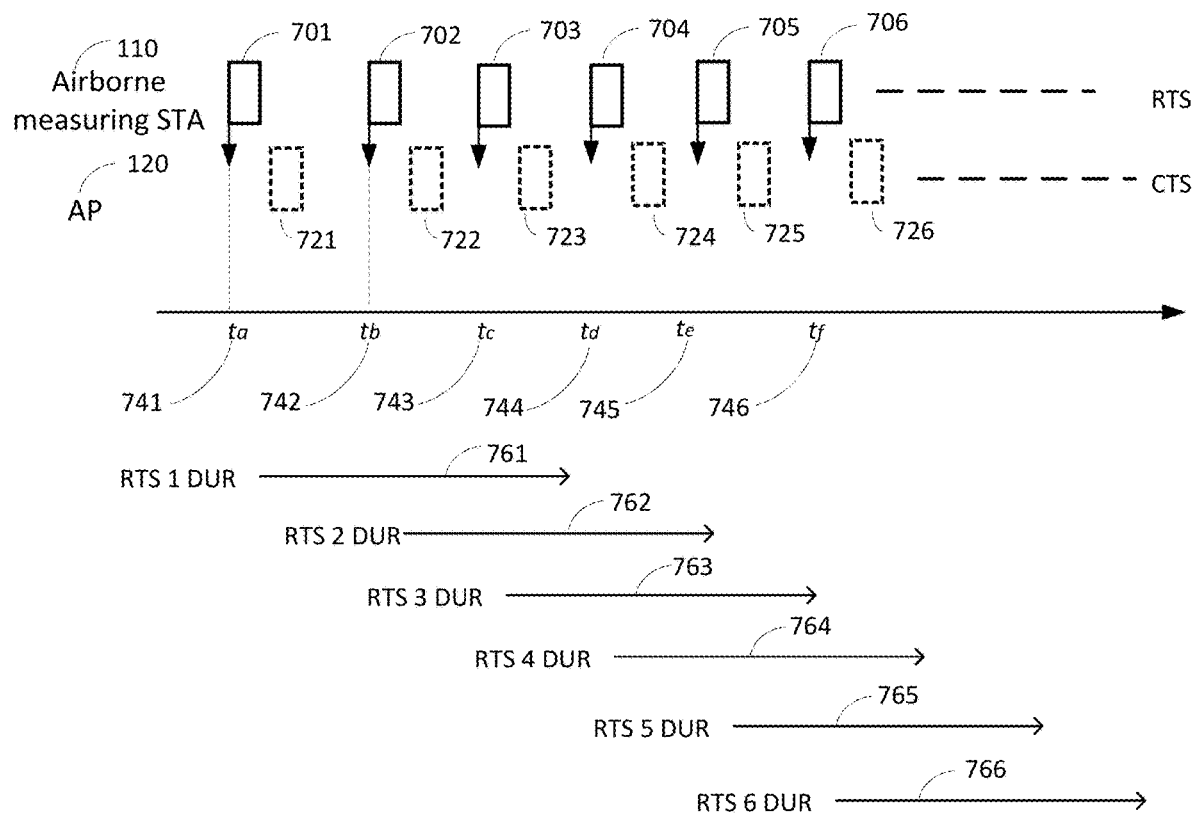
FIG. 7 is an exemplary diagram of one embodiment of the disclosure where the airborne station transmits a sequence of RTS packets, addressed to the ground AP.

FIG. 7 is an exemplary diagram of one embodiment of the disclosure. The airborne measuring station 110 transmits a sequence of RTS packets, 701, 702, 703, 704 705 and 706 at times ta 741, tb 742, tc 743, td 744, te 745 and tf 746 respectively, addressed to the ground AP 120. AP 120 will normally respond with CTS packets 721, 722, 723, 724, 725 and 726 respectively. The value 761 of the duration field of the first RTS, 701, is set to a value that reserves the medium for a time that extends beyond a number of RTS, CTS exchanges. In this example, duration value 761 is set to extend beyond the time, tc 743, that the third RTS, 703 is transmitted plus the time that the responding CTS 723 is transmitted. Similarly, the value of the duration field 762 of the second RTS 702 is set to extend beyond the time, tc 743, that the fourth RTS 704 is transmitted plus the time that the responding CTS 724 is transmitted. Similarly, the durations 763, 764, 965 and 766, for RTS packets 703, 704, 705 and 706 respectively are set to extend beyond the CTS transmission time corresponding to the next but one RTS transmission after the RTS which sets the duration time. Hence, as each RTS packet is transmitted by the airborne measuring STA 110, the chance is increased that the airborne measuring STA 110 will receive a CTS response from AP 120 as the other ground based devices defer their transmissions in abeyance of the duration values in the RTS transmissions.

Figure 8:
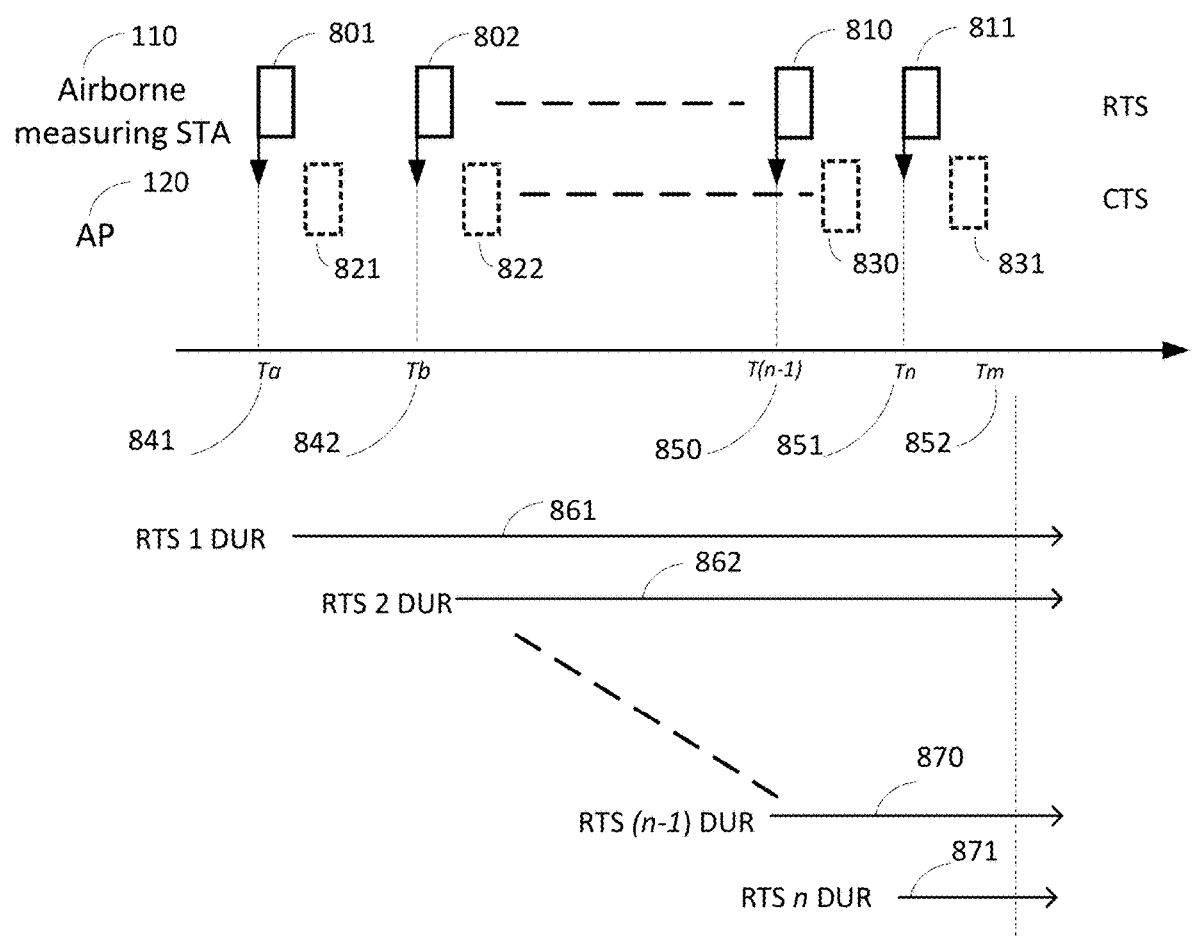
FIG. 8 is an exemplary diagram of another embodiment of the disclosure where the airborne station transmits a sequence of n RTS packets addressed to the ground AP.

FIG. 8 is an exemplary diagram of another embodiment of the disclosure. In this embodiment, the airborne measuring station 110 transmits a sequence of n RTS packets, 801, 802, to 810, 811 at times ta 841, tb 842, t(n−1) 850 and tn 851, respectively, addressed to the ground AP 120. AP 120 will normally respond with CTS packets 821, 822 to 830 and 831, respectively. The value 861 of the duration field of the first RTS, 801, is set to extend beyond time tm 852 which is after the completion of the reception at airborne measuring station 110 of the last CTS packet 831. The value 862 of the duration field of the second RTS, 802, is also set to extend beyond time tm 852. Similarly, the values of the duration fields of the rest of the RTS packets are also set to extend beyond time tm 852, including the duration value 870 for the (n−1)th RTS 810 and the duration value 871 for the nth RTS, 811.

As each RTS packet is transmitted by the airborne measuring STA 110, the chance is increased that the airborne measuring STA 110 will receive a CTS response from AP 120 as the other ground based devices defer their transmissions. Hence, by transmitting a sequence of RTS packets with duration field values that extend beyond the expected end of the final CTS response, the chance is increased that before the transmission of the nth RTS 811 the ground Wi-Fi devices will have set their NAV times accordingly and hence a number of the CTS responses from AP 120 will be received at airborne measuring STA 110 due to the absence of interference.

Figure 9:
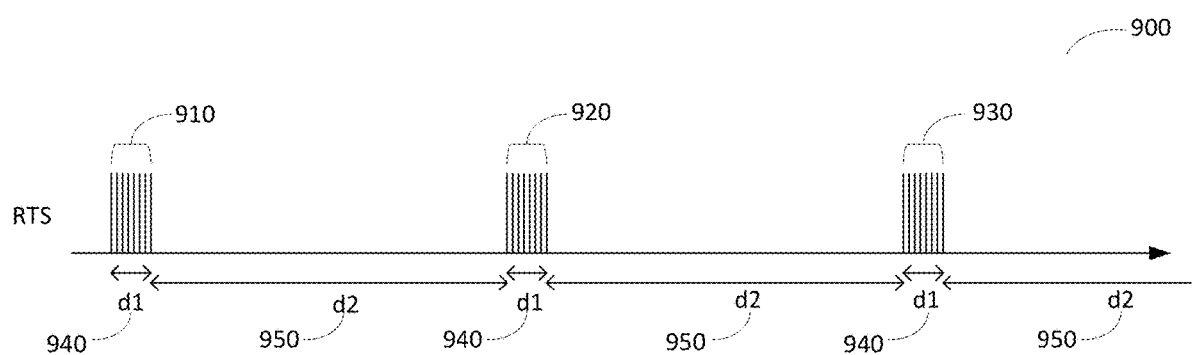
FIG. 9 is an exemplary timing diagram where bursts of RTS transmission, each of duration d1, are separated by a duration of d2.

So as not to delay transmissions in the ground based networks, each sequence of RTS transmissions may be separated by a time duration. FIG. 9 is an exemplary timing diagram 900 where bursts of RTS transmission, 910, 920 and 930, each of duration d1 940, are separated by a duration of d2 950. Hence, as shown in FIG. 8, the duration fields of the RTS packets in sequence 910 will be such that their values cover the duration d1 940 plus the time of a CTS response packet. In this way, the values of d1 940 and d2 950 may be chosen so as to send sufficient RTS sequences over time to satisfy the location requirements and that ground based networks are not unduly suppressed.

Figure 10:
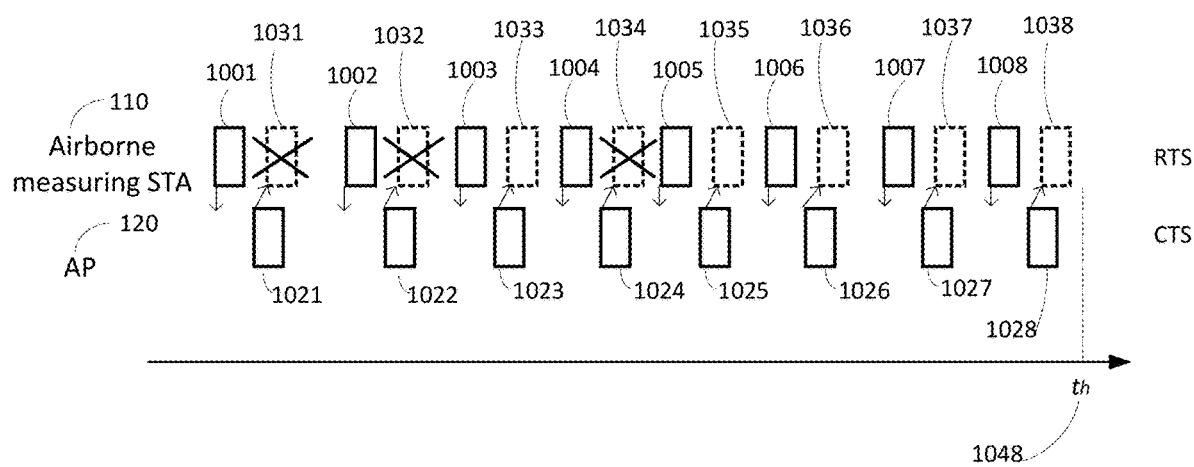
FIG. 10 is an exemplary diagram based upon FIG. 7 and FIG. 8.

FIG. 10 is an exemplary diagram based upon FIG. 7 and FIG. 8. In the example as depicted in FIG. 10, the airborne measuring STA 110 transmits a sequence of eight RTS packets 1002 to 1008. The values of the duration fields in these RTS packets are set, as explained in FIG. 8, to extend beyond the time, th 1048, that corresponds to the reception of the CTS response, 1038 to the last RTS 1008 in the sequence. As previously explained, the CTS packet transmitted by the AP 120 in response to an RTS packet transmitted by the airborne measuring STA 110 may or may not be received at the airborne measuring STA 110, dependent upon the timing and the relative signal strength(s) of the interference from other transmitting ground based devices, 440. In the example depicted in FIG. 10, the CTS packet 1021 transmitted by AP 120 in response to RTS packet 1001 is not received (1031) at airborne measuring STA 110. Similarly, the CTS packets 1022 and 1024, sent in response to RTS packets 1002 and 1004 respectively, are not received (1032 and 1034) at airborne measuring STA 110. Airborne measuring STA 110, however, does successfully receive CTS responses 1033, 1035, 1036, 1037 and 1038 resulting from the CTS transmissions 1023, 1025, 1026, 1027 and 1028 sent in response to the RTS transmissions 1003, 1005, 1006, 1007, and 1008 respectively. As successive RTS packets are transmitted, the probability that the other ground based devices receive and note the duration field values contained in the RTS packets increases and hence the probability that these other devices will observe the medium reservation time and delay their transmissions such that the interference at airborne measuring STA 110 is progressively decreased as further RTS packets in the sequence are sent. In this example, CTS response 1023 is a successfully received response 1033 even though the next CTS response 1024 is not successfully received 1034. This situation may occur, for example, if a ground based station or AP was transmitting at the same time as CTS response packet 1023 packet was transmitted by AP 120, but the signal strength of that interference, as received at airborne measuring STA 110, was not sufficient to block the reception. In fact, a possibility that a response CTS is not received is always present because of many factors such as relative signal strengths, antenna positioning, noise, interference, obstructions, etc.

As previously explained, the delay time is measured by recording the time of the reception of the CTS response and the time of the transmission of the RTS that caused that CTS response. Hence, it is desirable to know which CTS reception was received in response to which RTS transmission. For example, referring to FIG. 10, because CTS packet 1034 was not received at the airborne STA 110, in order to calculate the correct delay time, CTS packet 1035 should be correctly identified as the response to RTS packet 1005 and not to RTS packet 1004. To aid the calculations an identification scheme is used so as to match each CTS to its RTS.

As previously explained, the exchange of RTS (request to send) and CTS (clear to send) frames is often sent prior to a data frame, using the Duration fields to indicate the total medium reservation required to complete the data packet and Ack exchange following the RTS/CTS exchange. A STA that receives and decodes the value in the Duration field will delay transmitting any packet until that reservation period has expired after the receipt of the packet that contained the duration field. In the case where a succession of RTS/CTS exchanges are used for measuring the time delay, as shown in FIGS. 7, 8 and 9, the duration field values are used to reserve the medium and reduce the interference to the received CTS packets at the airborne measuring STA 110. A CTS packet, sent in response to an RTS packet, will place in its duration field a value that is equal to the value in the RTS duration field minus SIFS minus the duration of the CTS packet. For example, a CTS packet consists of 14 bytes, and if transmitted at a data rate of 1 Mb/s, its duration is 304 µs. SIFS is 10 µs, so the CTS packet will contain in its duration field a value that is 314 µs less than the value contained in the duration field of the received RTS packet to which it is responding. Thus, by setting particular values into the duration fields of the RTS packets, by observation of the received CTS packets one can confirm which CTS was sent in response to which RTS.

Figure 11:
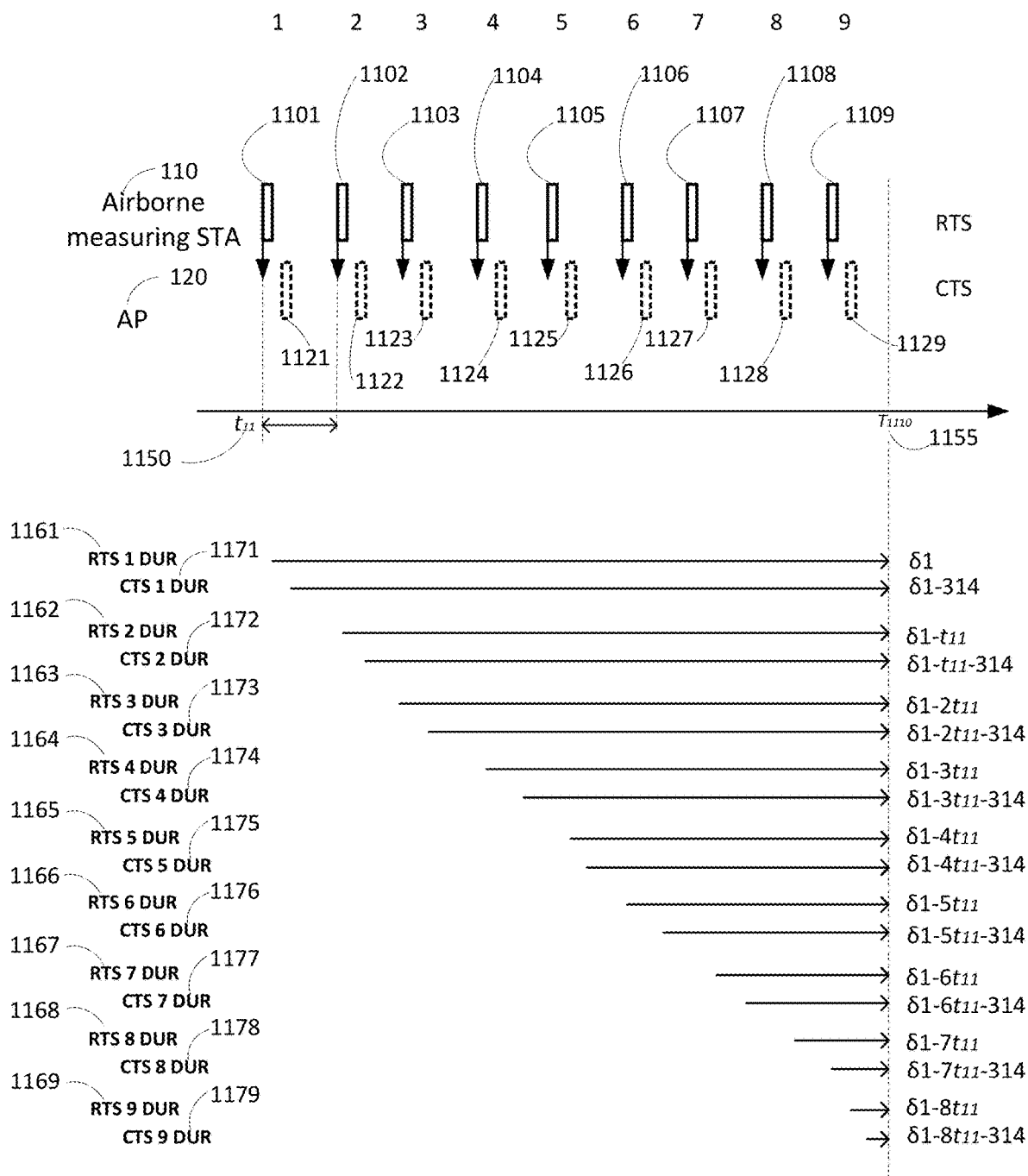
FIG. 11 is an exemplary diagram of one embodiment of the disclosure that enables a received CTS to be readily matched to the RTS that caused the CTS to be transmitted.

FIG. 11 is an exemplary diagram of one embodiment of the disclosure that enables a received CTS to be readily matched to the RTS that caused the CTS to be transmitted. The burst sequence consists of nine RTS transmissions, RTS 1 to 9, 1101 to 1109 transmitted by the airborne STA 110. In response to each RTS there is a CTS. Thus there are nine CTS transmissions, CTS 1 to 9, 1121 to 1129, transmitted by AP 120. In this example, the RTS and CTS transmissions are at a data rate of 1 Mb/s. The time between each RTS transmission is $t_{11}$, 1150. The value of the RTS 1 duration field, 1161, is $\delta 1$, which corresponds to reserving the medium until time $T_{1110}$, 1155. Time $T_{1110}$, 1155 is set to be after the expected reception of CTS 9, 1129 at the airborne STA 110. CTS 1, 1121, is transmitted in response to RTS 1, 1101. The value of the CTS 1 duration field, 1171, will be ($\delta 1-314$). After a period of $t_{11}$, airborne measuring STA 110 transmits RTS 2 1102. The value of the RTS 2 duration field, 1162, is ($\delta 1-t_{11}$), which again corresponds to reserving the medium until time $T_{1110}$, 1155. CTS 2, 1122, is transmitted in response to RTS 2, 1102 and the value of the CTS 2 Duration field, 1172, will be ($\delta 1-t_{11}-314$). After another period of $t_{11}$ airborne measuring station 110 transmits RTS 3 1103. The value of the RTS 3 duration field, 1162, is ($\delta 1-2t_{11}$), which again corresponds to reserving the medium until time $T_{1110}$, 1155. CTS 3, 1123, is transmitted in response to RTS 2, 1103 and the value of the CTS 3 duration field, 1173, will be ($\delta 1-2t_{11}-314$). Similarly for the subsequent RTS transmissions RTS 4 to RTS 9, 1104 to 1109 respectively, the value of the RTS n duration field, 1162, is ($\delta 1-(n-1)t_{11}$). CTS 4 to CTS 9, 1124 to 1129, are transmitted in response to RTS 4 to RTS 9, 1104 to 1109 respectively, and the value of the CTS n duration field, will be ($\delta 1-(n-1)t_{11}-314$).

A more complete understanding of this embodiment of the disclosure explained in FIG. 11 will be more readily understood by reference to the following example. Let $t_{11}$=1000 µs and $\delta 1$=10,000 µs. Then the duration field value of RTS 1, 1101, will be 10000 and the duration field value of CTS 1, 1121, will be 10000−314=9696. Similarly, a duration field value of RTS 2, 1102, will be 10000−1000=9000 and the duration field value of CTS 1, 1121, will be 9000−314=8686. Table 1 shows the values of the duration fields for RTS 1 to 9, 1101 to 1109, and CTS 1 to 9, 1121 to 1129.

TABLE 1

Example duration field values for RTS 1 to 9, and CTS 1 to 9.

| | 1 | 2 | 3 | 4 | 5 | 6 | 7 | 8 | 9 |
|---|---|---|---|---|---|---|---|---|---|
| RTS | 10000 | 9000 | 8000 | 7000 | 6000 | 5000 | 4000 | 3000 | 2000 |
| CTS | 9686 | 8686 | 7686 | 6686 | 5686 | 4686 | 3686 | 2686 | 1686 |

As can be seen from Table 1, which CTS corresponds to which RTS can be identified. The CTS will have a duration value 314 less than the corresponding RTS and the number is unique such that if only a selection of CTSs are received at airborne measuring STA 110, it can be determined to which RTS the CTS was responding.

It is noted that the values of $t_{11}$ and $\delta 1$ can be chosen from a wide variety of values and may indeed be varied according to the interference scenario.

Figure 12:
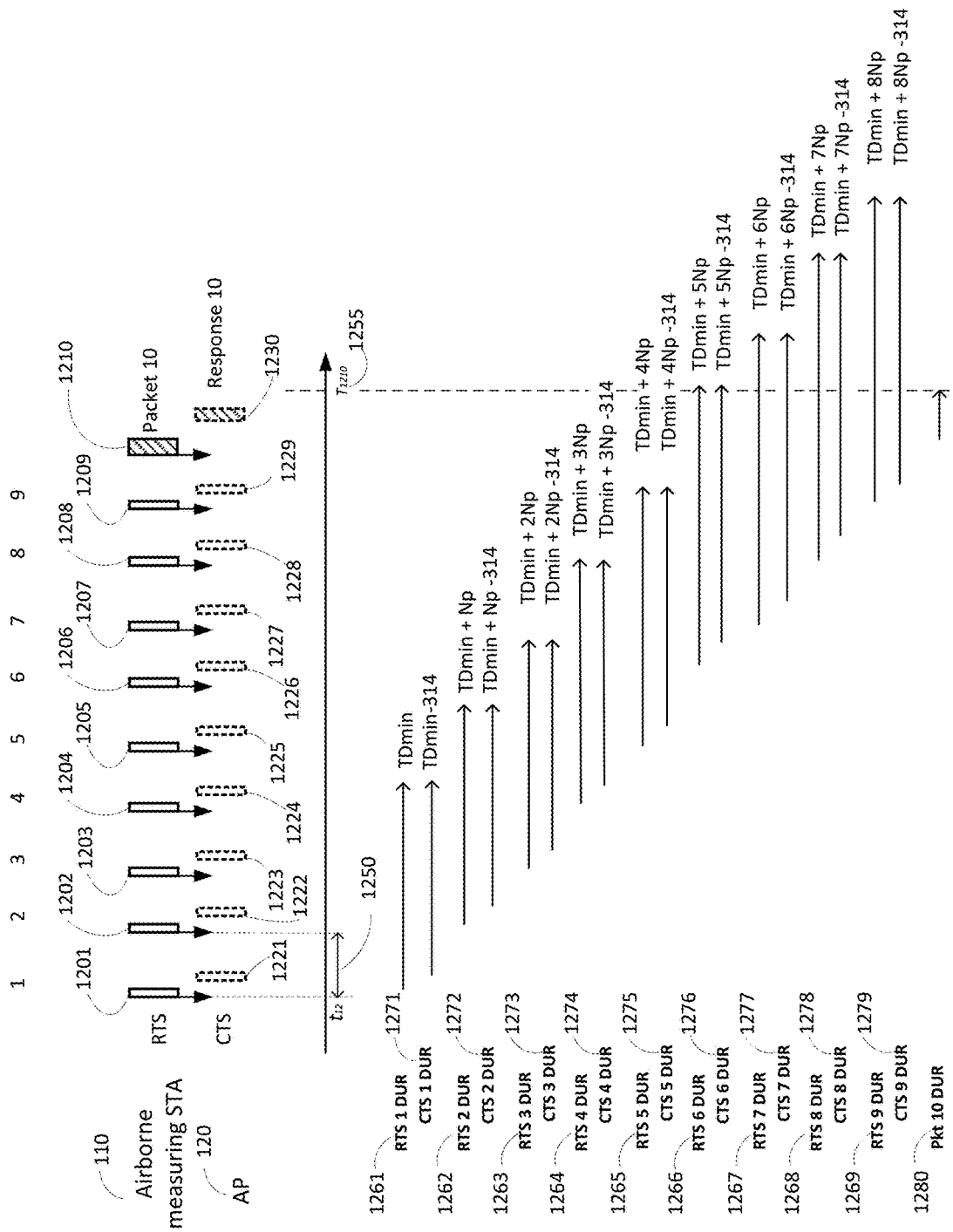
FIG. 12 is an exemplary diagram of another embodiment of the disclosure that enables a received CTS to be readily matched to the RTS that caused the CTS to be transmitted.

FIG. 12 is an exemplary diagram of another embodiment of the disclosure that enables a received CTS to be readily matched to the RTS that caused the CTS to be transmitted. The burst sequence consists of nine RTS transmissions, RTS 1 to 9, 1201 to 1209 transmitted by the airborne STA 110. In response to each RTS there is a CTS. Thus, there are nine CTS transmissions, CTS 1 to 9, 1221 to 1229, transmitted by AP 120. In this example, the RTS and CTS transmissions are at a data rate of 1 Mb/s. The time between each RTS transmission is $t_{12}$, 1250. In this embodiment, the duration value (TD) 1261, of the first RTS transmission, RTS 1 1201 is set to a preset value TDmin. TDmin is set to reserve the medium for a time that covers a number of subsequent RTS transmissions. In the example depicted in FIG. 12, TDmin is set to a value that is between 3 and 4 times $t_{12}$, 1250. CTS 1, 1221, is transmitted in response to RTS 1, 1201. The value of the CTS 1 duration field, 1271, will be (TDmin−314). After a period of $t_{12}$, airborne measuring station 110 transmits RTS 2 1202. The value of the RTS 2 duration field, 1262, is set to a value of TDmin+Np, where Np is a fixed number. CTS 2, 1222, is transmitted in response to RTS 2, 1202 and the value of the CTS 2 duration field, 1272, will be TDmin+Np−314. After another period of $t_{12}$ airborne measuring station 110 transmits RTS 3 1203. The value of the RTS 3 duration field, 1262, is TDmin+2 Np, and CTS 3, 1223, is transmitted in response to RTS 2, 1203 and the value of the CTS 3 duration field, 1273, will be TDmin+2 Np−314.

The value of the duration field, TDn, in the nth RTS is set according to the following formula:

$TD1 = TDmin$ $TDn = TDn-1 + (n-1)Np$ for $TDmin < TDn < TDmax$

If $TDn > TDmax$

Then $TDn = TDn-1 + (n-1)Np - (TDmax - TDmin)$ (4)

The concept is that the duration valueTD is kept between fixed values, TDmin and TDmax. TD is incremented by Tp until it exceeds TDmax. At this point, in order to maintain the value between TDmin and TDmax, the value (TDmax−TDmin) is subtracted.

In the example depicted in FIG. 12, there is a burst of nine RTS transmissions from airborne measuring STA 110. After the last RTS 9 1209 has been transmitted, the medium will still be reserved for a significant period beyond what is required. In order to release the reservation, packet 10 1210 is transmitted with its duration field value set to reserve the medium up to time $T_{1210}$, 1255, in order to cover any expected response, 1230, to packet 10 1210.

Packet 10 1210, may be any packet that includes the duration field, for example a data (null) packet, a management packet or a control packet. In one embodiment of this disclosure, a probe request packet is sent after the last RTS packet in a burst. This serves two purposes: resetting the medium reservation for the ground networks, and soliciting a probe response from the AP 120. The probe response contains the channel number upon which the AP 120 is transmitting and this may be used to confirm the channel that airborne measuring STA 110 is using. In the 2.4 GHz band, there are 14 channels of which only 3 are non-overlapping, so it is possible to receive on an adjacent or even co-adjacent channel. Hence confirming the channel number of the AP 120 is beneficial. In the case that packet 10, 1210 is a probe request, the duration field value, 1280 would be set to a value in the order of 3-5 milliseconds so as to allow for the reception of the probe response (assuming 1 MB/s data rate). If packet 10, 1210, is a data (null) packet then the value in the duration field would be set to cover the response packet 1230, in this case an acknowledgement packet.

Choosing values for TDmin, TDmax and Np is somewhat dependable upon $t_{12}$, 1250 the nominal space between the RTS transmissions in the burst. A more complete understanding of this embodiment of the disclosure explained in FIG. 12 will be more readily understood by reference to the following example. Assume, for example, a time period of 1 millisecond between the RTS transmissions, i.e., $t_{12}$=1000 μs. TDmin may then be chosen as 3500 (μs) and TDmax as 4500 (μs). So as to ensure unique TD values, Np should be a prime number. Assume Np=101. As described in FIG. 9, the disclosure consists of repetitive bursts of RTS transmissions. In this embodiment of the disclosure, the number n of the RTS transmission continues to increment, therefore, for example, if each burst consists of 9 RTS transmissions, then for the first burst n=1 to 9, for the second burst, n=10 to 18, for the third burst, n=19 to 27, and so forth. Using formula (4) the value TDn can be derived. In this example, TDmax−TDmin=1000, if Np is a prime number then for n=1 to 1000 each value of TDn will be different. Therefore 1000 RTS transmissions are with unique values in their duration fields before repeating the values. Table 2 shows the values of the duration fields for RTS 1 to 27, and CTS 1 to 27 according to this example.

TABLE 2

Example duration field values for RTS 1 to 27, and CTS 1 to 27.

| | TDmin 3500 | | | TDmax 4500 | | | Np 101 | | |
|---|---|---|---|---|---|---|---|---|---|
| | 1 | 2 | 3 | 4 | 5 | 6 | 7 | 8 | 9 |
| RTS | 3500 | 3601 | 3702 | 3803 | 3904 | 4005 | 4106 | 4207 | 4308 |
| CTS | 3186 | 3287 | 3388 | 3489 | 3590 | 3691 | 3792 | 3893 | 3994 |

TABLE 2-continued

Example duration field values for RTS 1 to 27, and CTS 1 to 27.

| | TDmin 3500 | | | TDmax 4500 | | | Np 101 | | |
|---|---|---|---|---|---|---|---|---|---|
| | 10 | 11 | 12 | 13 | 14 | 15 | 16 | 17 | 18 |
| RTS | 4409 | 3510 | 3611 | 3712 | 3813 | 3914 | 4015 | 4116 | 4217 |
| CTS | 4095 | 3196 | 3297 | 3398 | 3499 | 3600 | 3701 | 3802 | 3903 |
| | 20 | 21 | 22 | 23 | 24 | 25 | 26 | 27 | 28 |
| RTS | 4419 | 3520 | 3621 | 3722 | 3823 | 3924 | 4025 | 4126 | 4227 |
| CTS | 4105 | 3206 | 3307 | 3408 | 3509 | 3610 | 3711 | 3812 | 3913 |

As can be seen from Table 2, the duration field values are unique and hence each CTS response can be easily matched to its RTS. It should be noted that the values of TDmin, TDmax, Np and $t_{12}$ can be chosen from a wide variety of values and may, indeed, be varied according to the interference scenario.

In another embodiment of the disclosure, the airborne measuring STA 110 may be transmitting the RTS bursts to more than one ground AP. In this case, by choosing differing values for TDmin, TDmax and possibly Np, each CTS response can be distinguished and linked to the RTS that solicited it.

As will be appreciated by one of skill in the art, alternative packets may be used in place of the RTS/CTS exchange. For example, a data null/acknowledgement (ACK) may be used between the airborne measuring STA 110 and AP 120. In this case, however, the responding ACK does not include a value in the duration field unless fragmentation is indicated, which is not standard in a data null frame. Also, for AP 120 to accept data frames from airborne measuring STA 110, airborne measuring STA 110 should be associated to AP 120. As will also be appreciated by one skilled in the art, airborne measuring STA 110 may be sending the ranging transmissions to more than one ground AP and in this case, the flexibility presented by using the RTS/CTS and the positive identification of the CTS response to the RTS request is desirable. By positively identifying the CTS response to the RTS request the propagation time delay δt, as described in FIG. 2, FIG. 3, equation (2) and equation (3), can be determined with confidence.

Furthermore, by sending a burst of several RTS, as shown in FIG. 11 and FIG. 12, it is highly likely that several CTS responses will be received and hence, several measurements of the propagation time delay δt will result. For each burst, the multiple values of δt received in that burst may be averaged, thereby improving the accuracy of the measurement. It is well known that the accuracy of a measurement is improved by the square root of the number of measurements, so hence, if a burst of say 10 RTS transmissions resulted in 9 CTS responses, for example, then the accuracy of the measurement of δt is improved by a factor of 3. In addition, the airborne measuring STA 110 may include one transmitter and a number of receivers. By noting the RTS transmission time and the CTS response received time on a number of receivers in the airborne station, if each of the receivers uses an independent clock, then the accuracy of the measurement of δt may be significantly improved. For example, assuming that the measurement accuracy is 1 μs, or 1000 feet in position, then if there are, say, 19 receivers in the airborne measuring STA 110 and a transmission burst of 10 RTSs result in, for example, 8 CTS responses, then for that burst there are 19×9=152 measurements of δt. By averaging the measurements, the accuracy of the resulting averaged measurement of δt is theoretically accurate to 0.08 µs, or 80 feet in position.

In order to transmit the initial and subsequent RTS packets, the airborne measuring STA 110 may need to ignore the CS setting due to the multiple receptions from the transmitting ground networks 440 as described in FIG. 4 and FIG. 5. In order to facilitate the transmission of the RTS packets, the setting of the duration fields and the associated timing, in one embodiment of the disclosure the airborne measuring STA 110 comprises one separate transmitter and one or more receivers, rather than a transceiver arrangement, as will be described in FIG. 17.

Figure 13:
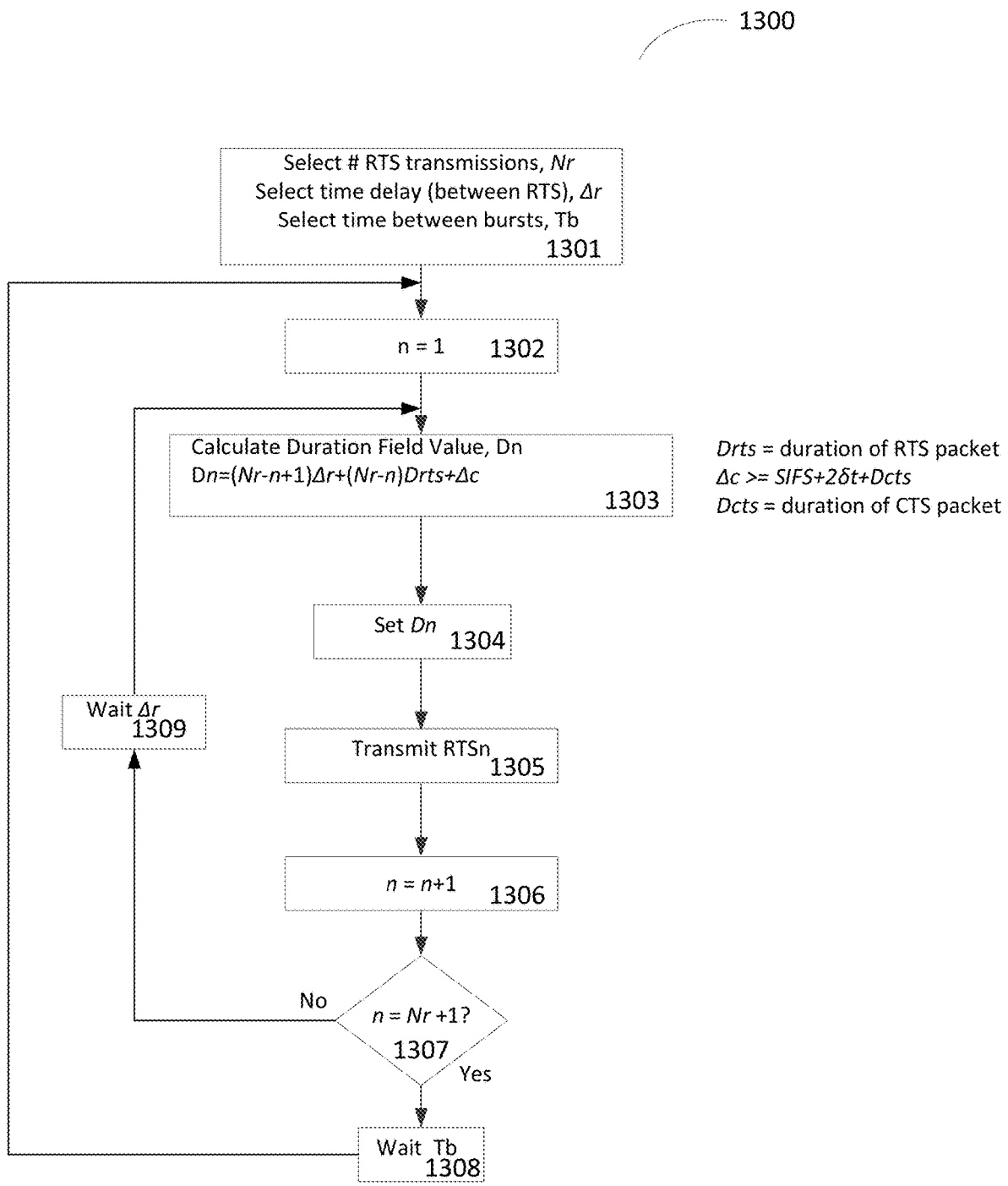
FIG. 13 illustrates a method according to an exemplary embodiment of the disclosure for the transmissions of the RTS packets, by airborne STA, as previously described in FIG. 11.

FIG. 13 illustrates method 1300 according to an exemplary embodiment of the disclosure for the transmissions of the RTS packets, by airborne measuring STA 110, as previously described in FIG. 11. The method may start with step 1301 where the parameters for the RTS packets are set. These parameters may include: the number of RTS packets per burst, Nr, the time delay between each RTS in the burst, Δr, and the time between bursts, Tb. Step 1301 may be followed by step 1302 where a value n is initialized. Step 1302 may be followed by step 1303 where the value, Dn, of the duration field to be used in the RTS packets is calculated. As described in FIG. 11 the value of the duration field in the RTS packet needs to reserve the medium until after the receipt of the CTS to the last RTS. A value for Dn may be derived using equation (5).

$$Dn=(Nr-n+1)\Delta r+(Nr-n)Drts+\Delta c \quad (5)$$

where
Drts is the duration of an RTS packet
Δc is a duration that is equal to or greater than SIFS+2 δt+Dcts
and Dcts is the duration of a response CTS packet.

Note that the duration Δc includes the propagation delay δt. A fixed value may be used that corresponds, say, to the maximum range that the location system is designed for, or it may be derived from the area 410 that was described with reference to FIG. 4.

Step 1303 may be followed by step 1304 where the duration value $D_1$ is set and then, in step 1305 the first RTS packet is transmitted. Step 1305 may be followed by step 1306 where the value for n is incremented. Step 1306 may be followed by step 1307 where the value of n is checked against the number of RTS transmission in a burst, Nr. If n<Nr+1 then step 1307 may be followed by step 1309 where the process waits for a time of Δr and then may return to step 1303. Successive RTS packets are thus transmitted until the check at step 1307 results in n=Nr, and at that point step 1307 may be followed by step 1308 where the process waits for a time of Tb and then returns to step 1302. Hence, bursts of Nr RTS packets are transmitted each separated by a period of Tb.

As previously stated, in this embodiment of the disclosure, airborne measuring STA 110 includes one separate transmitter and one or more receivers, as will be described below with reference to FIG. 17.

Figure 14:
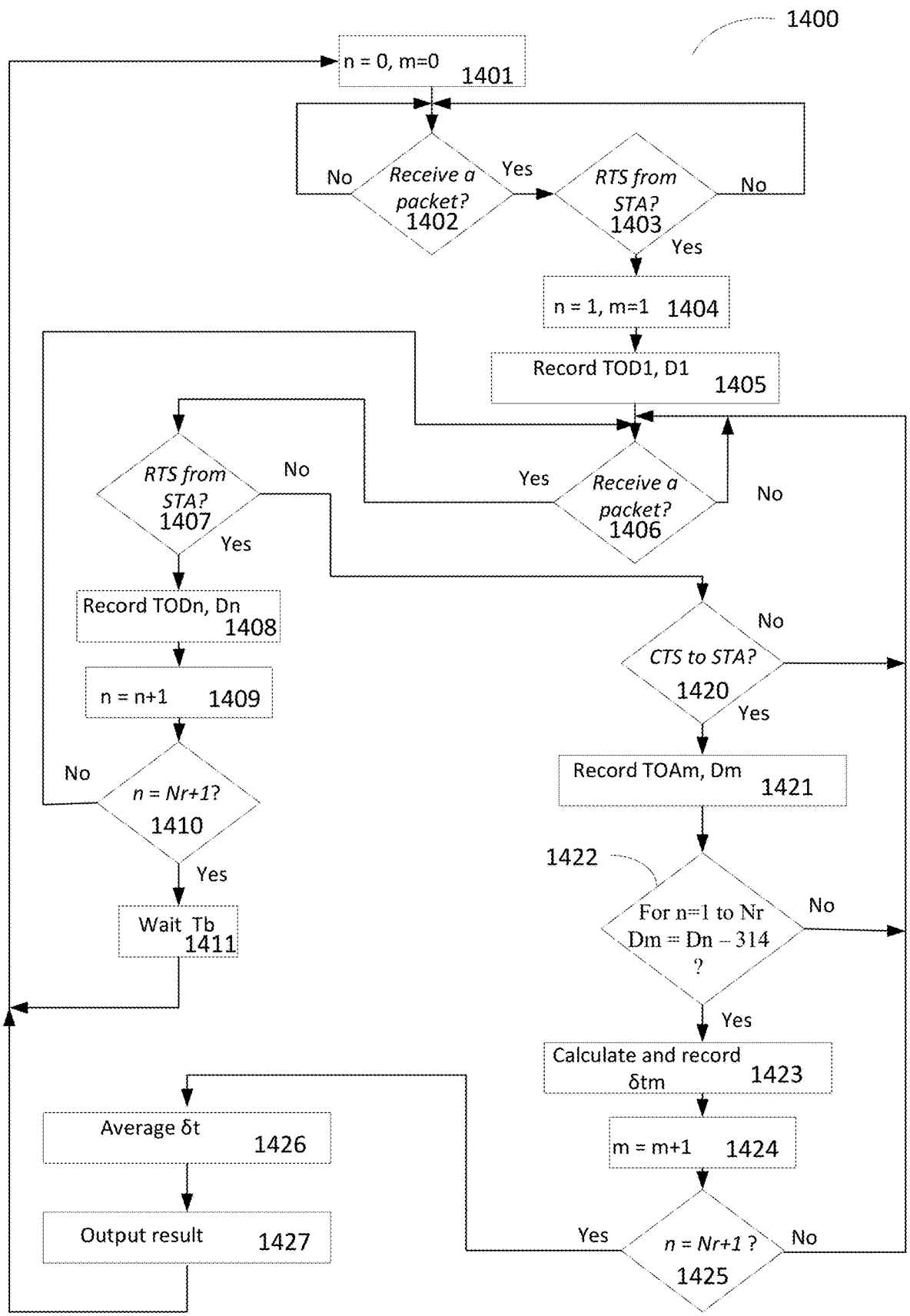
FIG. 14 illustrates method according to an exemplary embodiment of the disclosure for the reception by airborne STA of the RTS packets transmitted by airborne STA, as previously described in FIG. 13, and the CTS packets that are transmitted by the ground based AP as a result of the RTS transmissions as previously described in FIG. 13.

FIG. 14 illustrates method 1400 according to an exemplary embodiment of the disclosure for the reception by airborne measuring STA 110 of the RTS packets transmitted by airborne measuring STA 110, as previously described with reference to FIG. 13, and the CTS packets that are transmitted by the ground based AP 120 as a result of the RTS transmissions as previously described in FIG. 13. The method may start with step 1401 where the parameters n and m are initialized to value 0. Step 1401 may be followed by step 1402 where it is determined if a packet is received. As the packet may be any packet, step 1402 may be followed by step 1403 where it is checked if the received packet from step 1402 is an RTS packet that is being sent by the airborne measuring STA 110 as described in FIG. 13. Every RTS transmission that is sent by the transmitter stage of airborne measuring STA 110 should be received at airborne measuring STA 110 by the receiving stages of airborne measuring STA 110. If in step 1403 it is determined that the received packet is an RTS transmission from airborne measuring STA 110, then step 1403 may be followed by step 1404 where n and m are incremented to value 1, indicative of the first RTS in the burst, and then by step 1405 where the time that the RTS was received, the time of departure TOD1, and the value D1 of the of the duration field in the RTS packet are recorded. If in step 1403 it is determined that the received packet is not an RTS packet from airborne measuring STA 110, then the process returns to step 1402. Step 1405 may then be followed by step 1406 where it is again determined if another packet is received. Step 1406 may then be followed by step 1407 where it is determined whether the received packet from step 1405 is an RTS packet that is being sent by the airborne measuring STA 110. If the received packet is an RTS packet sent by STA 110, then step 1407 may be followed by step 1408 where the time that the RTS was received, TODn, and the value Dn of the of the duration field in the RTS packet are recorded. Step 1408 may be followed by step 1409 where n is incremented. Step 1409 may be followed by step 1410 where the value of n is checked against Nr+1 If n=Nr+1 then that RTS was the last in the burst and step 1410 may be followed by step 1411 where the method waits for time Tb before returning to step 1401.

If the received packet at step 1407 is not an RTS from the airborne measuring STA 110, then step 1407 may be followed by step 1420 where it is determined whether the received packet from step 1405 is a CTS packet that is being sent to STA 110. If it is not, then the process returns to step 1406. If, in step 1420, it is determined that the received packet is a CTS addressed to airborne measuring STA 110, the step 1420 may be followed by step 1421 where the time of arrival TOAm of the packet, and the value Dm of the duration field are recorded. Step 1421 may be followed by step 1422 where the duration values of the RTS and CTS packets are examined, Dn and Dm respectively to determine which CTS packet was the result of which RTS packet. For example, assuming that the RTS and CTS packets are transmitted at 1 mb/s by examining the duration field values, Dn and Dm for all n and m the condition where Dm=Dn−314 is true matches up the correct CTS to the RTS and hence TODn and TODm can be matched. Step 1422 may be followed by step 1423 where the propagation delay time δtm, using formula (3), may be calculated and recorded. Step 1423 may be followed by step 1424 where the value for M is incremented. Step 1424 may be followed by step 1425 where the value of n is checked. If n<Nr+1 then the CTS just received does not correspond to the last RTS of the burst and the method may return to step 1406. If n=Nr+1 then the CTS just received corresponded to the last RTS of the burst and step 1425 may be followed by step 1426 where all the calculated delay times, δtm, for that burst of RTS transmissions, may be averaged. Step 1426 may be followed by step 1427 where the result of step 1426 may be outputted to an application or program that uses the value(s) of δtm to calculate the location of AP 120. Step 1427 may be followed by step 1401 where the reception of the next burst of RTS transmissions takes place.

Hence, as described in FIG. 14, a receiver in the airborne measuring STA 110 may be used to receive the time of the reception (TODs) of each RTS sent in each burst and to receive and time the reception (TOAs) of each CTS that resulted from the RTS transmissions. Each CTS can be coupled to the RTS that caused it to be transmitted by examining the duration value in the RTS and the CTS packets and hence the corresponding TODs and TOAs can be established enabling the calculation of the propagation delay times. The method as described in FIG. 14 may take place in one or more receivers that are embodied in the airborne measuring STA 110.

Figure 15:
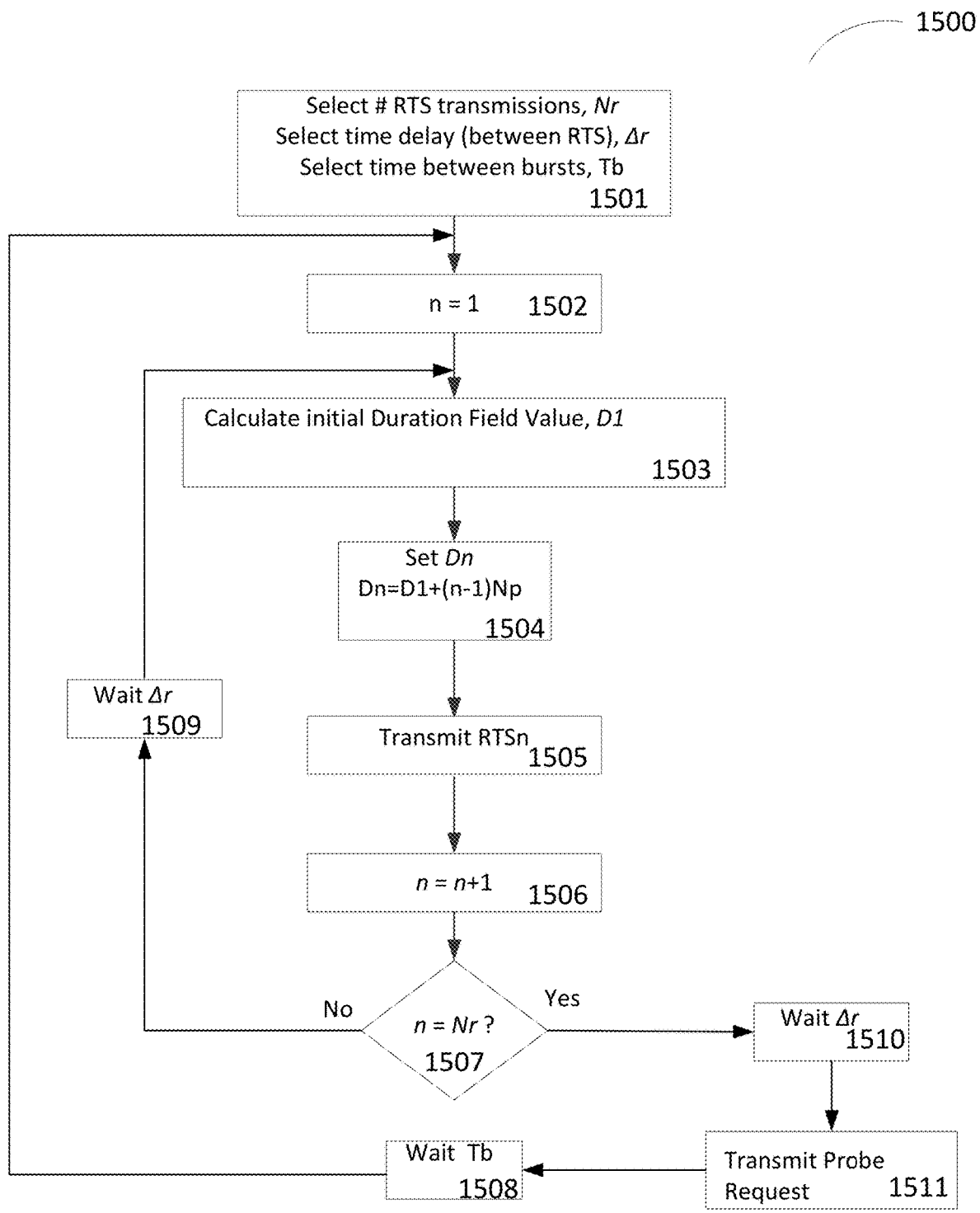
FIG. 15 illustrates a method according to an exemplary embodiment of the disclosure for the transmissions of the RTS packets, by airborne STA, as previously described in FIG. 12.
Figure 16:
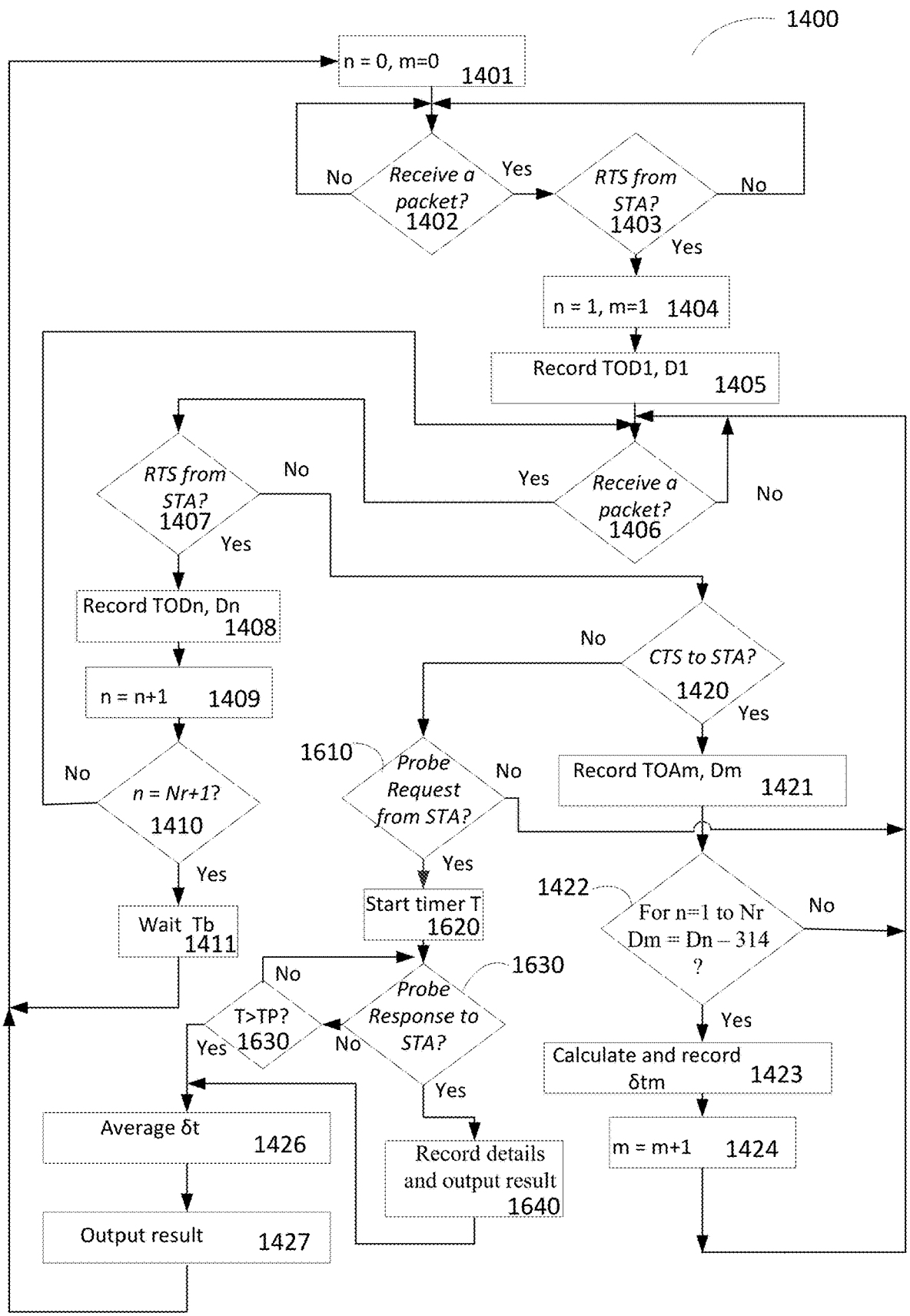
FIG. 16 illustrates a method according to an exemplary embodiment of the disclosure for the reception by airborne STA of the RTS packets and probe request transmitted by airborne STA, as previously described in FIG. 15, and the CTS packets and probe response that are transmitted by the ground based AP as a result of the RTS and probe request transmissions as previously described in FIG. 13.

FIG. 13 and FIG. 14 illustrate methods 1300 and 1400 according to an exemplary embodiment of the disclosure for the transmissions of the RTS packets, by the airborne measuring STA 110, as previously described with reference to FIG. 11. FIG. 15 and FIG. 16 illustrate methods 1500 and 1600 according to an exemplary embodiment of the disclosure for the transmissions of the RTS packets, by the airborne measuring STA 110, as previously described with reference to FIG. 12.

FIG. 15 illustrates method 1500 according to an exemplary embodiment of the disclosure for the transmissions of the RTS packets, by airborne measuring STA 110, as previously described with reference to FIG. 12. The method may start with step 1501 where the parameters for the RTS packets are set, similar to those set in step 1301. These parameters may include: the number of RTS packets per burst, Nr, The time delay between each RTS in the burst, $\Delta r$, and the time between bursts, Tb. Step 1501 may be followed by step 1502 where a value n is initialized. Step 1502 may be followed by step 1503 where the value, D1, of the duration field to be used in the first RTS packet is calculated. As described with reference to FIG. 12, the value of the duration field in the RTS packet needs to reserve the medium to cover the transmission of a number of RTS packets. In the example described with reference to FIG. 12, this value may be 3500 so as to cover the first 4 RTS transmissions. Step 1503 may be followed by step 1504 where the duration value Dn is set. As described with reference to FIG. 12, a number Np may be used to derive the value of Dn where Dn=D1+(n−1) Np. Np may be a prime number, for example 101. Step 1504 may be followed by step 1505 where the first RTS packet is transmitted. Step 1505 may be followed by step 1506 where the value for n is incremented. Step 1506 may be followed by step 1507 where the value of n is checked against the number of RTS transmission in a burst, Nr. If n<Nr+1 then step 1507 may be followed by step 1509 where the process waits for a time of $\Delta r$ and then may return to step 1503. Successive RTS packets are thus transmitted until the check at step 1507 results in n=Nr, and at that point step 1507 may be followed by step 1510 where the process waits for a time of $\Delta r$ before transmitting a probe request in step 1511. Step 1511 may be followed by step 1508 where the method waits for a time of Tb and then returns to step 1502. Hence, bursts of Nr RTS packets and one probe request are transmitted each separated by a period of Tb.

FIG. 16 illustrates method 1600 according to an exemplary embodiment of the disclosure for the reception by airborne measuring STA 110 of the RTS packets and probe request transmitted by airborne measuring STA 110, as previously described with reference to FIG. 15, and the CTS packets and probe response that are transmitted by the ground based AP 120 as a result of the RTS and probe request transmissions as previously described with reference to FIG. 13. Steps 1401 to 1411, 1420 to 1424, 1426 and 1427 are identical to those described with reference to FIG. 14.

The addition that method 1600 adds to method 1400 is that at step 1420 if the received packet is not an CTS to airborne measuring STA 110, then step 1420 may be followed by step 1610 where the received packet is check to establish if it is a probe request from airborne measuring STA 110. If the received packet is not a probe request from airborne measuring STA 110, then the method returns to step 1406. If the received packet is a probe request from airborne measuring STA 110 then step 1610 may be followed by step 1620 where a timer T is started. Step 1620 may be followed by step 1630 where the method, together with step 1630 checks to see if a probe response from AP 120 is received within time TP. Time TP is set to be slightly greater than the time that a probe response from AP 120 would be expected after the probe request has been transmitted. For example, a time of TP=5 milliseconds may be used. If a probe response is received within the time TP then step 1620 may be followed by step 1640 where the details contained in the probe response may be recorded and outputted to an application or program. Of particular interest may be the confirmation of the channel number. Step 1640 may be followed by steps 1426. If after a time of TP after the reception of the probe request in step 1610 a probe response is not received, step 1630 may be followed by step 1426. Note that in method 1600, in comparison to method 1400, step 1425 is omitted and having incremented the value of m in step 1424, the method returns to step 1406.

Hence, as described with reference to FIG. 16, a receiver in airborne measuring STA 110 may be used to receive the time of the reception (TODs) of each RTS sent in each burst and to receive and time the reception (TOAs) of each CTS that resulted from the RTS transmissions, plus the reception of a probe request from airborne measuring STA 110 and the corresponding probe response from AP 120. Each CTS can be coupled to the RTS that caused it to be transmitted by examining the duration value in the RTS and the CTS packets as described with reference to FIG. 12, and hence the corresponding TODs and TOAs can be established enabling the calculation of the propagation delay times. The method as described with reference to FIG. 16 may take place in one or more receivers that are embodied in airborne measuring STA 110. Although airborne measuring STA 110 is shown as a single device, it is understood that airborne measuring STA 110 is not limited to a single physical device and that the functions performed by airborne measuring STA 110 can be distributed among multiple physical devices.

Figure 17:
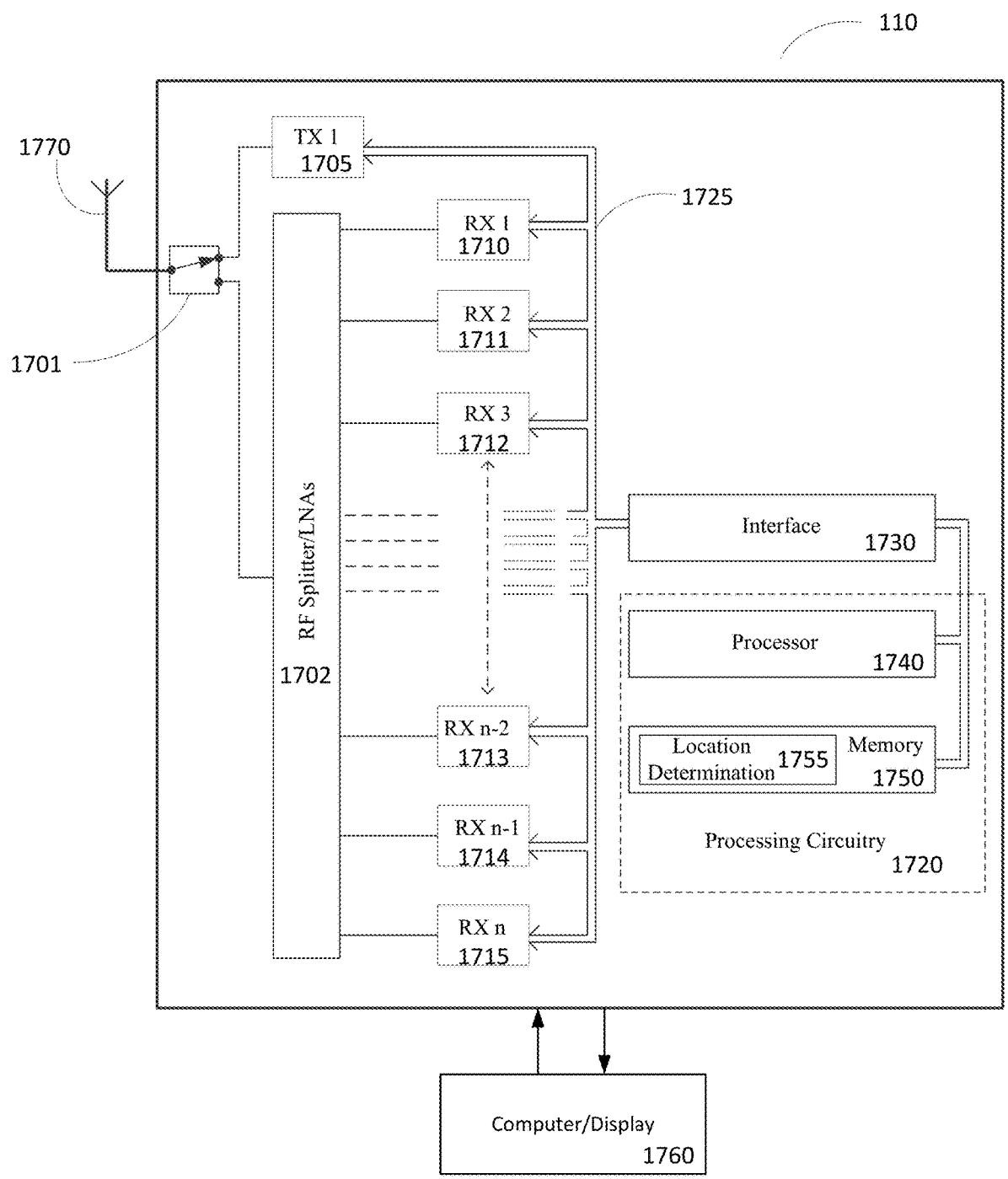
FIG. 17 is a block diagram of an airborne measuring station constructed in accordance with the principles of the present disclosure.

FIG. 17 is a block diagram of an airborne measuring STA 110 that complies with an embodiment of this disclosure. A single antenna 1770, is connected to an RF switch 1701 which is used to connect the antenna 1770 to either the transmitter 1705, or to the input of an RF splitter/LNA block 1702. Block 1702 comprises RF circuitry that splits the incoming signal from the antenna 1770, via the RF switch 1701 into several outputs each of which is connected to one of the receiver blocks 1710 to 1715. Note that the details of the FR splitter/LNA block 1702 may vary as the number of receivers is varied and that the number of receivers is not fixed. One of more low noise amplifiers (LNA) are used, in combination with one or more RF splitters such that the splitter loss is compensated for and that the effective noise figure for the receivers 1710 to 1725 is low. This embodiment of the disclosure represents an airborne measuring STA 110 that has a single transmitter 1705 that may be used to transmit packets to a specific target device, AP or STA, or to send management or control packets to broadcast or specific addresses. Packets received at the antenna 1770 may be received by every receiver block 1710 to 1715 via RF switch 1701

Airborne measuring station 110 may include an interface block 1730, and processing circuitry 1720 having a processor 1740, and a memory 1750. The interface 1730 may act as the interface control between the processor 1740, the transmitter 1705 and the receivers 1710 to 1715 via the control bus 1725. The interface 1730 and/or the processing circuitry 1720 may include elements for constructing control, management and data packets and sending them to the transmitter 1705 for the transmission of packets via the RF switch 1701 and the antenna 1770. According to this embodiment of the disclosure, the interface 1730 and/or the processor 1740 is configured to transmit management, data and control packets and to receive input signals based upon the IEEE 802.11 standard. The processor 1740 is configured to measure and monitor input signals' attributes, including the preamble, MAC header and timing according to the IEEE 802.11 standard. Interface 1730 and/or processor 1740 is arranged to receive input signals and the processor 1740 is arranged to measure and monitor input signals' attributes, including management, data and control packets transmitted by an access point or other ground based station that is based upon the IEEE 802.11 Standard.

The interface 1730 and/or the processor 1740 may include elements for the measuring and/or calculating attributes of received signals (input signals) that are passed from the receivers 1710 to 1715. The memory module 1750 may store instructions for executing any method mentioned in the specification, input signals, and results of processing of the processor 1740, signals to be outputted and the like. Airborne measuring STA 110 may include a computer/display 1760 that interfaces with the processor 1740 and may also interface with the memory module 1750. Computer/Display 1760 may be used by an operator to display the results of the operations described in this disclosure in the form of a location or locations displayed on a map display. The Computer/Display 1760 may be used to input control messages to the processor 1740 such as to starting and stopping the transmission and reception of packets as described in this disclosure.

In addition to a traditional processor and memory, processing circuitry 1720 may include integrated circuitry for processing and/or control, e.g., one or more processors and/or processor cores and/or FPGAs (Field Programmable Gate Array) and/or ASICs (Application Specific Integrated Circuitry). Processor 1740 may be configured to access (e.g., write to and/or read from) memory 1750, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 1750 may be configured to store code executable by processor 1740 and/or other data, e.g., data pertaining to communication, e.g., configuration and/or address data of nodes, etc. Memory 1750 also includes location determination code 1755 configured to perform the processes described herein when executed, especially those described with reference to FIGS. 13-16. In other words, memory 1750 has instructions that, when executed by processor 1740, configures processor 1740 to perform the location determination processes described herein.

As explained with reference to FIG. 14 and FIG. 15, each of the multiple receivers 1710 to 1715 may be used to receive the RTS, CTS, probe request and probe response packets transmitted by the airborne measuring STA 110 and the ground AP 120. The interface 1730 and/or the processor 1740 may be used to perform the methods as described with reference to FIG. 14 and FIG. 16 and to output the results to the computer/display 1760. The interface 1730 and/or processor 1740 may also be used to perform the calculations of the propagation delays δt across each of the receivers 1710 to 1715 such that, by averaging the results of the multitude of timings, the resultant accuracy is improved.

In some embodiments, the transmitter 1705 is configured to transmit in succession a plurality of request to send (RTS) transmissions, each RTS transmission having a duration field that specifies a duration that extends beyond transmission times of at least a subset of the plurality of RTS transmissions, such that ground local area network traffic is delayed for a specified duration corresponding to at least one RTS transmission. At least one of the receivers 1710-1715 is configured to receive at least one clear to send (CTS) transmission from the one of the second airborne station and the ground based station, each CTS transmission being in response to an RTS. The processor 1740 is configured to compute the distance between the first airborne station and the one of the second airborne station and the ground based station based on a time difference between transmission of a particular one of the RTS transmissions and receipt of a CTS transmission responsive to the particular one of the RTS transmissions.

Figure 18:
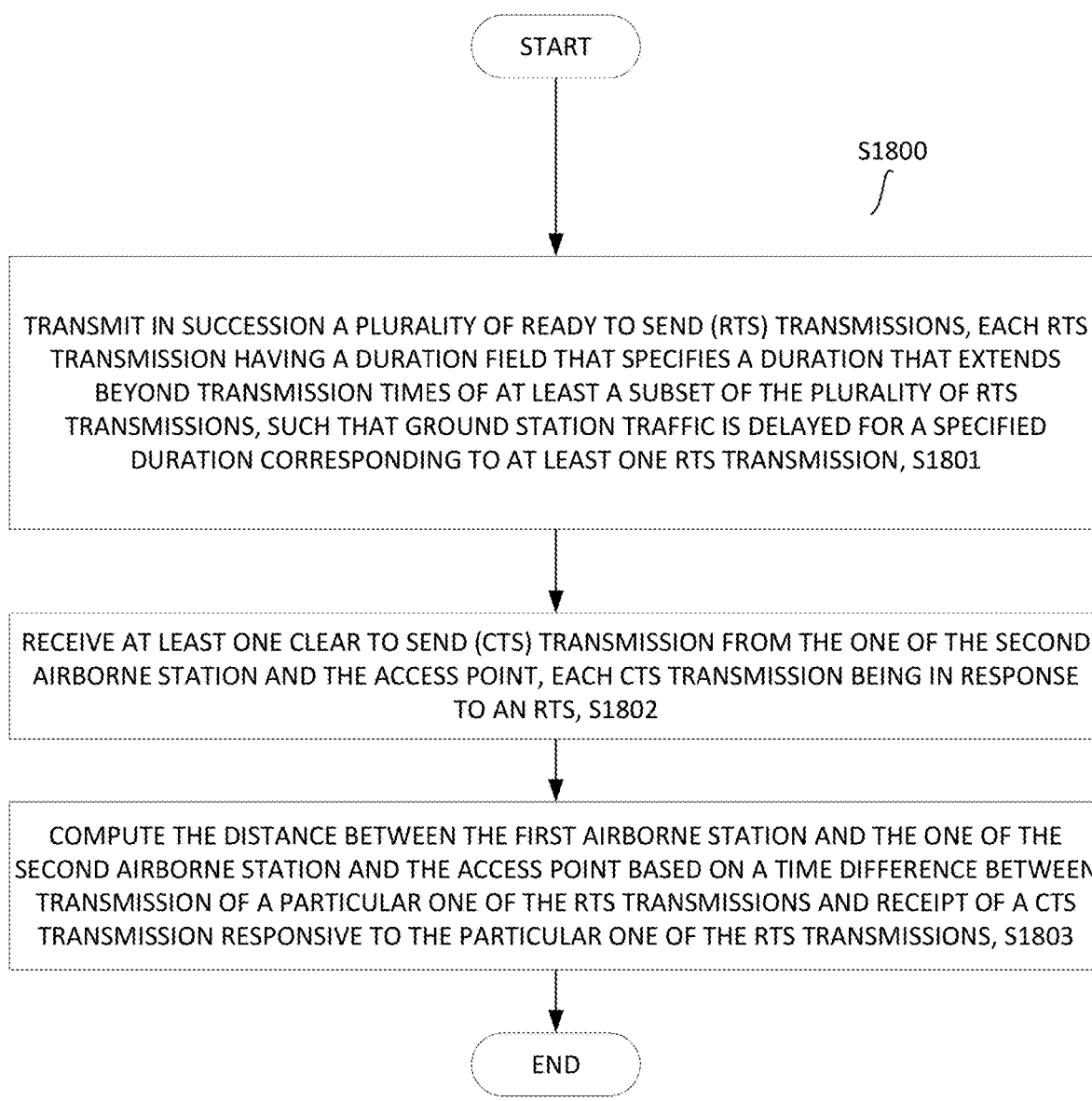
FIG. 18 is a flowchart of an exemplary process for measuring a distance between the first airborne station and one of a second airborne station and an access point.

FIG. 18 is a flowchart 1800 of an exemplary process in an airborne device for measuring a distance between the first airborne station and a ground based station. The process includes transmitting in succession a plurality of request to send (RTS) transmissions, each RTS transmission having a duration field that specifies a duration that extends beyond transmission times of at least a subset of the plurality of RTS transmissions, such that ground local area traffic is delayed for a specified duration corresponding to at least one RTS transmission (block S1801). The process also includes receiving at least one clear to send (CTS) transmission from the ground based station, each CTS transmission being in response to an RTS (block S1802). The process further includes computing the distance between the airborne station and the ground based station based on a time difference between transmission of a particular one of the RTS transmissions and receipt of a CTS transmission responsive to the particular one of the RTS transmissions (block S1803).

FIG. 19 is a flowchart 1900 of an exemplary process in an airborne station. The process includes transmitting a first burst of request to send (RTS) signals, each RTS signal having a duration field that specifies a duration Td encompassing a duration of several RTS signals such that ground local area network traffic is delayed for a specified duration corresponding to at least one RTS transmission (block S1901). The process also includes receiving at least one clear to send (CTS) signal from a ground based station, each of the at least one CTS signal being in response to a particular one of the RTS signals (block S1902). The process further includes delaying transmission of a second burst of N RTS signal for a period of time to allow delayed ground local area network traffic to be transmitted (block S1903).

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the number of RTS transmissions used, the repetition rate and duty cycle of the RTS transmissions and bursts, the values of the duration values used in the RTS transmissions, the type of packet used as the final transmission at the end of each burst to reset the NAV times of the ground networks, the choice of values for TDmin, TDmax and Np, the configuration of the radio receiver used as the airborne station such as number of receivers and/or use of transceivers. Accordingly the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in an airborne station for measuring a distance between the airborne station and a ground based station, the method comprising:
    transmitting from the airborne station, in succession, a plurality of request to send (RTS) transmissions, each RTS transmission having a duration field that specifies a duration that extends beyond transmission times of at least a subset of the plurality of RTS transmissions, such that ground local area network traffic is delayed for a specified duration corresponding to at least one RTS transmission;
    receiving at least one clear to send (CTS) transmission from the ground based station, each CTS transmission being in response to an RTS; and
    computing the distance between the airborne station and the ground based station based on a time difference between transmission of a particular one of the RTS transmissions and receipt of a CTS transmission responsive to the particular one of the RTS transmissions.

2. The method of claim 1, wherein a CTS transmission responsive to the particular one of the RTS transmissions is identified based on a duration value contained in the CTS transmission.

3. The method of claim 2, wherein a duration TDn specified by an $n^{th}$ RTS transmission is given by:

$$TDn = TDn-1 + (n-1)Np \text{ for } TDmin < TDn < TDmax$$

where Np is a number.

4. The method of claim 3, wherein a duration $TD_c$ contained in the CTS transmission responsive to the $n^{th}$ RTS transmission is given by:

$$TD_c n = TDn-1 + (n-1)Np - \Delta \text{ for } TDmin < TDn < TDmax$$

where $\Delta$ is a number.

5. The method of claim 1, further comprising transmitting a packet subsequent to the plurality of RTS transmissions, the subsequent packet configured to reset network allocation vector (NAV) times for ground based stations whose ground local area network traffic was delayed.

6. The method of claim 1, wherein time differences for multiple pairs of RTS transmissions and CTS transmission are averaged.

7. The method of claim 1, wherein the plurality of RTS transmissions are transmitted in a burst, followed by a time period that is longer than a duration of the burst to enable time for the delayed ground local area network traffic to be transmitted between bursts.

8. The method of claim 1, wherein the airborne station has a plurality of receivers and the method further includes:
computing, for each receiver of the plurality of receivers, a time difference based on a CTS signal received by the receiver; and
averaging the time differences computed by the plurality of receivers.

9. An airborne station configured to measure a distance between the airborne station and a ground based station, the airborne station comprising:
a transmitter configured to transmit in succession a plurality of request to send (RTS) transmissions, each RTS transmission having a duration field that specifies a duration that extends beyond transmission times of at least a subset of the plurality of RTS transmissions, such that ground local area network traffic is delayed for a specified duration corresponding to at least one RTS transmission;
at least one receiver configured to receive at least one clear to send (CTS) transmission from the ground based station, each CTS transmission being in response to an RTS; and
a processor configured to compute the distance between the airborne station and the ground based station based on a time difference between transmission of a particular one of the RTS transmissions and receipt of a CTS transmission responsive to the particular one of the RTS transmissions.

10. The airborne station of claim 9, wherein a CTS transmission responsive to the particular one of the RTS transmissions is identified based on a duration value contained in the CTS transmission.

11. The airborne station of claim 10, wherein a duration $TDn$ specified by an $n^{th}$ RTS transmission is given by:

$$TDn=TDn-1+(n-1)Np \text{ for } TDmin<TDn<TDmax$$

where Np is a number.

12. The airborne station of claim 11, wherein a duration $TD_c$ contained in the CTS transmission responsive to the $n^{th}$ RTS transmission is given by:

$$TD_cn=TDn-1+(n-1)Np-\Delta \text{ for } TDmin<TDn<TDmax$$

where $\Delta$ is a number.

13. The airborne station of claim 9, wherein the transmitter is further configured to transmit a packet subsequent to the plurality of RTS transmissions, the subsequent packet configured to reset network allocation vector (NAV) times for ground stations whose ground local area network traffic was delayed.

14. The airborne station of claim 9, wherein time differences for multiple pairs of RTS transmissions and CTS transmission are averaged.

15. The airborne station of claim 9, wherein the plurality of RTS transmissions are transmitted in a burst, followed by a time period that is longer than a duration of the burst to enable time for the delayed ground local area network traffic to be transmitted between bursts.

16. The airborne station of claim 9, wherein the airborne station has a plurality of receivers and the processor is further configured to:
compute, for each receiver of the plurality of receivers, a time difference based on a signal received by the receiver; and
average the time differences computed by the plurality of receivers.

17. A method in an airborne station, the method comprising:
transmitting a first burst of request to send (RTS) signals, each RTS signal having a duration field that specifies a duration Td encompassing a duration of several RTS signals such that ground station traffic is delayed for a specified duration corresponding to at least one RTS transmission;
receiving at least one clear to send (CTS) signal from a ground based station, each of the at least one CTS signal being in response to a particular one of the RTS signals; and
delaying transmission of a second burst of N RTS signal for a period of time to allow delayed ground local area network traffic to be transmitted.

18. The method of claim 17, wherein a CTS signal is deemed to be responsive to a particular one of the RTS signals based on a duration value contained in a duration field of the CTS signal.

19. The method of claim 17, further comprising, transmitting a packet subsequent to the burst of RTS transmissions, the subsequent packet configured to reset network allocation vector (NAV) times for ground based stations whose ground local area network traffic was delayed.

20. The method of claim 17, wherein the airborne station has a plurality of receivers and the method further includes:
computing, for each receiver of the plurality of receivers, a time difference based on a signal CTS signal received by the receiver; and
averaging the time differences computed by the plurality of receivers.

* * * * *